(12) United States Patent
Zimmerman et al.

(10) Patent No.: US 9,215,882 B2
(45) Date of Patent: Dec. 22, 2015

(54) ADDITIVE MANUFACTURING SYSTEM AND METHOD FOR PRINTING CUSTOMIZED CHOCOLATE CONFECTIONS

(75) Inventors: Aidan Zimmerman, Medford, MA (US); Daniel F. Walczyk, Brunswick, NY (US); S. Scott Crump, Wayzata, MN (US); J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 450 days.

(21) Appl. No.: 13/432,424

(22) Filed: Mar. 28, 2012

(65) Prior Publication Data
US 2012/0251688 A1 Oct. 4, 2012

Related U.S. Application Data

(60) Provisional application No. 61/469,305, filed on Mar. 30, 2011.

(51) Int. Cl.
*A23G 1/18* (2006.01)
*A23G 1/20* (2006.01)
(Continued)

(52) U.S. Cl.
CPC *A23G 1/206* (2013.01); *A23G 1/50* (2013.01); *A23G 3/0097* (2013.01); *A21C 15/002* (2013.01); *A23G 1/0066* (2013.01); *A23G 1/042* (2013.01); *A23G 1/18* (2013.01);
(Continued)

(58) Field of Classification Search
CPC ..... A23P 2001/089; A23P 1/12; A23P 1/085; A23G 1/0063; A23G 1/0066; A23G 1/042; A23G 1/18; A23G 1/205; A23G 1/206; A23G 1/50; A23G 3/0097; A23G 3/2092; A23G 3/28; A23L 1/0076; A21C 15/002
USPC ........... 425/375, 97, 100, 112, 113, 143, 145, 425/169, 378.1; 426/231, 512, 519, 660; 700/118, 119, 196; 101/368
See application file for complete search history.

(56) References Cited

U.S. PATENT DOCUMENTS 2,784,096 A 3/1957 Ciccone
3,533,374 A 10/1970 Luescher
(Continued)

FOREIGN PATENT DOCUMENTS

CH 635986 A5 5/1983
DE 1956057 A1 1/1971
(Continued)

OTHER PUBLICATIONS

International Search Report and Written Opinion dated Mar. 28, 2012 from International Patent Application No. PCT/US2012/030841.

*Primary Examiner* — Seyed Masoud Malekzadeh
(74) *Attorney, Agent, or Firm* — Westman, Champlin & Koehler, P.A.

(57) ABSTRACT

An additive manufacturing system for printing a chocolate confection, the system comprising a platen, a recirculation loop configured to circulate a flow of a chocolate material, and further configured to maintain a temper of the chocolate material; and a print head the print head being configured to receive at least a portion of the chocolate material from the recirculation loop, and further configured to extrude and deposit the chocolate material onto the platen to print at least a portion of the chocolate confection based on the commands from a controller.

18 Claims, 10 Drawing Sheets

(51) Int. Cl.
*A23G 1/50* (2006.01)
*A23G 3/34* (2006.01)
*A23G 3/28* (2006.01)
*A23G 1/00* (2006.01)
*A23P 1/08* (2006.01)
*A21C 15/00* (2006.01)
*A23P 1/12* (2006.01)
*A23G 1/04* (2006.01)
*A23L 1/00* (2006.01)

(52) U.S. Cl.
CPC .............. *A23G 1/205* (2013.01); *A23G 3/28* (2013.01); *A23L 1/0076* (2013.01); *A23P 1/085* (2013.01); *A23P 1/12* (2013.01); *A23P 2001/089* (2013.01)

(56) References Cited

U.S. PATENT DOCUMENTS

| | | | |
|---|---|---|---|
| 3,921,858 A | 11/1975 | Bemm | |
| 5,121,329 A | 6/1992 | Crump | 364/468 |
| 5,303,141 A | 4/1994 | Batchelder et al. | 364/149 |
| 5,312,224 A | 5/1994 | Batchelder et al. | 415/73 |
| 5,340,433 A | 8/1994 | Crump | 156/578 |
| 5,480,664 A | 1/1996 | Ferrero | |
| 5,503,785 A | 4/1996 | Crump et al. | 264/40.7 |
| 5,514,390 A | 5/1996 | Aasted | 426/231 |
| 5,525,364 A | 6/1996 | Haslund | 426/231 |
| 5,764,521 A | 6/1998 | Batchelder et al. | 364/475.01 |
| 5,850,782 A | 12/1998 | Aasted | 99/455 |
| 5,881,923 A | 3/1999 | Bokros | |
| 5,939,008 A | 8/1999 | Comb et al. | 264/308 |
| 6,003,733 A | 12/1999 | Wheeler | |
| 6,004,124 A | 12/1999 | Swanson et al. | 425/375 |
| 6,022,207 A | 2/2000 | Dahlin et al. | 425/145 |
| 6,051,267 A | 4/2000 | Jury et al. | |
| 6,054,077 A | 4/2000 | Comb et al. | 264/40.7 |
| 6,065,395 A | 5/2000 | Sollich | 99/470 |
| 6,067,480 A | 5/2000 | Stuffle et al. | 700/109 |
| 6,085,957 A | 7/2000 | Zinniel et al. | 226/8 |
| RE36,937 E | 10/2000 | Mackley | |
| 6,238,613 B1 | 5/2001 | Batchelder et al. | 264/404 |
| 6,280,785 B1 | 8/2001 | Yang et al. | |
| 6,547,995 B1 | 4/2003 | Comb | 264/40.1 |
| 6,685,866 B2 | 2/2004 | Swanson et al. | 264/308 |
| 6,749,414 B1 | 6/2004 | Hanson et al. | 425/130 |
| 6,814,907 B1 | 11/2004 | Comb | 264/40.07 |
| 6,860,788 B2 | 3/2005 | Small et al. | |
| 6,998,087 B1 | 2/2006 | Hanson et al. | 264/308 |
| 7,891,964 B2 | 2/2011 | Skubic et al. | 425/375 |
| 8,556,392 B2 * | 10/2013 | de Grood et al. | 347/85 |
| 2003/0232113 A1 | 12/2003 | Refer | |
| 2004/0130593 A1* | 7/2004 | Decorte | 347/40 |
| 2006/0127548 A1 | 6/2006 | Nakanishi | |
| 2007/0231427 A1 | 10/2007 | Ream | 426/5 |
| 2008/0260918 A1 | 10/2008 | Lai et al. | 426/231 |
| 2009/0095163 A1* | 4/2009 | Sala et al. | 99/284 |
| 2009/0285954 A1* | 11/2009 | Simbuerger et al. | 426/470 |
| 2009/0317528 A1 | 12/2009 | Abylov et al. | |
| 2011/0074065 A1 | 3/2011 | Batchelder et al. | 264/308 |
| 2011/0076496 A1 | 3/2011 | Batchelder et al. | 428/373 |
| 2011/0121016 A1* | 5/2011 | De Grood et al. | 222/1 |
| 2012/0251688 A1 | 10/2012 | Zimmerman et al. | |
| 2012/0285943 A1 | 11/2012 | Guerrero | |

FOREIGN PATENT DOCUMENTS

| | | |
|---|---|---|
| EP | 1161880 A1 | 12/2001 |
| GB | 686565 | 1/1953 |
| GB | 2334196 A | 8/1999 |

\* cited by examiner

ADDITIVE MANUFACTURING SYSTEM AND METHOD FOR PRINTING CUSTOMIZED CHOCOLATE CONFECTIONS

CROSS-REFERENCE TO RELATED APPLICATION(S)

This application claims priority to U.S. Provisional Patent Application No. 61/469,305, filed on Mar. 30, 2011, and entitled "ADDITIVE MANUFACTURING SYSTEM AND METHOD FOR PRINTING CUSTOMIZED CHOCOLATE CONFECTIONS".

BACKGROUND

The present disclosure relates to additive manufacturing systems and methods for building three-dimensional (3D) objects with layer-based, additive manufacturing techniques. In particular, the present disclosure relates to layer-based, additive manufacturing systems for printing edible chocolate confections.

An additive manufacturing process is used to build 3D objects in a layer-by-layer manner. For example, an additive manufacturing process developed by Stratasys, Inc. prints a 3D object from a digital representation of the 3D object in a layer-by-layer manner by extruding a flowable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D object resembling the digital representation.

The modeling materials for use in these extrusion-based 3D printers are typically amorphous thermoplastic materials. As such, the resulting 3D objects may be fabricated from the industrial-quality, thermoplastic materials that provide good part strengths and chemical resistances to the 3D parts. However, the application of edible materials in the field of additive manufacturing would allow commercial vendors and consumers to effectively print edible 3D objects. This may expand the field of additive manufacturing to commercial and consumer markets that have previously been overlooked. For example, chocolate has an interesting place in the minds of consumers, and is a luxury that has become one of the most popular holiday gifts. For example, molded chocolate shapes have become holiday traditions (e.g., chocolate hearts, eggs, and bunnies). As such, there is an ongoing need for systems and techniques for creating intricate and customized shapes from edible materials, such as chocolate materials.

SUMMARY

An aspect of the present disclosure is directed to an additive manufacturing system for printing a chocolate confection. The additive manufacturing system includes at least one controller configured to receive instructions for printing the chocolate confection, and further configured to relay commands relating to the received instructions. The system also includes a platen and a recirculation loop configured to circulate a flow of a chocolate material, and further configured to maintain a temper of the chocolate material. The system further includes a print head in signal communication with the at least one controller, the print head being configured to receive at least a portion of the chocolate material from the recirculation loop, and further configured to extrude and deposit the chocolate material onto the platen to print at least a portion of the chocolate confection based on the commands from the controller.

Another aspect of the present disclosure is directed to a chocolate extrusion assembly for use in an additive manufacturing system. The chocolate extrusion assembly includes a reservoir configured to shear and heat a chocolate material to a temperature ranging from about 82° F. to about 90° F. to provide a flowable chocolate material, a pump configured to pump the flowable chocolate material from the reservoir, and a print head configured to receive the pumped flowable chocolate material, and further configured to extrude a first portion of the received chocolate material. The chocolate extrusion assembly also includes a heating line configured to heat the pumped flowable chocolate material as the pumped flowable chocolate material flows through the pump to the print head, and a re-melter configured to receive a second portion of flowable chocolate material from the print head and to direct the second portion of flowable chocolate material to the reservoir. The re-melter is further configured to heat the second portion of the flowable chocolate material to fully melt the second portion of the flowable chocolate material.

Another aspect of the present disclosure is directed to a method for printing a chocolate confection. The method includes shearing and heating a chocolate material in a reservoir to a temperature ranging from about 82° F. to about 90° F. to provide a flowable chocolate material, and pumping the flowable chocolate material from the reservoir to a print head. The method also includes heating the pumped flowable chocolate material between the reservoir and the print head, and extruding a first portion of the pumped flowable chocolate material from the print head to print at least a portion of the chocolate confection using a layer-based additive manufacturing technique. The method further includes recirculating a second portion of the flowable chocolate material from the print head, and heating the recirculating second portion of the flowing chocolate material to fully liquefy the second portion of the flowing chocolate material.

DETAILED DESCRIPTION

Figure 1:
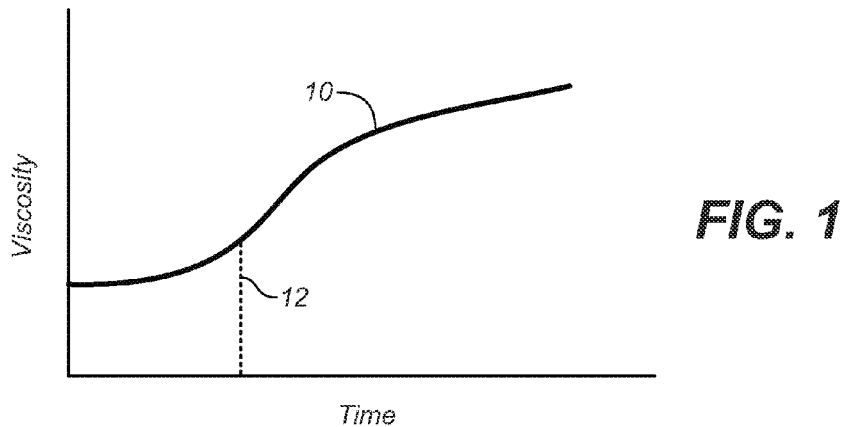
FIG. 1 is a plot of viscosity of chocolate over time while the chocolate is sheared at a constant shear rate and while being maintained at a suitable tempering temperature, which illustrates the thickening properties of chocolate over time.

The present disclosure is directed to an additive manufacturing system and method for printing customized chocolate confections. The system includes a recirculation loop configured to maintain a temper of a chocolate material to form chocolate confections with the desired chocolate crystal phase (e.g., phase V crystal chocolate), while also keeping the chocolate material in a state of shear. As discussed below, the recirculation loop of the system may also be configured to re-temper the chocolate material during operation in a batch or continuous process. This allows the chocolate material to reside in the system for longer durations, such as for building large chocolate confections.

As used herein, the term "chocolate confection" refers to a three-dimensional object having a composition derived from a chocolate material. The term "chocolate material" refers to a material that includes chocolate such as sweet chocolate (e.g., milk chocolate), dark chocolate, white chocolate, baking chocolate, and the like. As discussed below, in some embodiments, the chocolate material may also include one or more additional additives. Chocolate is a complex organic compound that is temperature sensitive, has multiple stable crystalline phases, is a non-Newtonian fluid when in a liquid form, and thickens over time. Chocolate is produced from seeds of the cacao tree, which are fermented, dried, cleaned, and roasted to produce cacao nibs. The cacao nibs are ground to cocoa mass, which is then typically liquefied and formed into chocolate liquor. The chocolate liquor may then be processed into cocoa solids and cocoa butter.

The resulting chocolate may then be further processed to the desired form. For example, baking chocolate contains primarily includes cocoa solids and cocoa butter. Dark chocolate and sweet chocolate are similar to baking chocolate, and also include sugar, and optionally, additional fats. Milk chocolate is a form of sweet chocolate that also includes milk (e.g., powdered milk and/or condensed milk). White chocolate on the other hand, includes cocoa butter, sugar, and milk (e.g., powdered milk and/or condensed milk), but does not include cocoa solids.

As mentioned above, chocolate has multiple stable crystalline phases. This is primarily due to the cocoa butter, which is polymorphic and crystallizes into several different forms depending how the liquid cocoa butter solidifies. The polymorphic nature of the cocoa butter is believed to be the result of the different glycerides present in the cocoa butter. Table 1 lists the six different crystalline phases that cocoa butter can form, along with the respective melting temperatures and physical characteristics.

TABLE 1

| Crystal Phase | Melting Temperature | Physical Characteristics |
| --- | --- | --- |
| I | 17° C. (63° F.) | Soft, crumbly, melts too easily. |
| II | 21° C. (70° F.) | Soft, crumbly, melts too easily. |
| III | 26° C. (78° F.) | Firm, poor snap, melts too easily. |
| IV | 28° C. (82° F.) | Firm, poor snap, melts too easily. |
| V | 34° C. (94° F.) | Glossy, firm, best snap, melts near body temperature (37° C.). |
| VI | 36° C. (97° F.) | Hard, takes weeks to form. |

Stability increases from phase I to phase VI, with phase V crystal chocolate (also referred to as β form) being the most desirable for use as commercial chocolate. As shown in Table 1, phase V crystal chocolate has the most desirable melting temperature and aesthetic properties, and is also the most palatable. The cocoa butter in chocolate is crystallized to phase V by a tempering process, in which the chocolate is heated and cooled to specific temperatures under carefully controlled conditions. Nearly all commercially produced edible chocolate is phase V crystal chocolate. The other crystal phases result in less desirable chocolate, such as chocolate that is unpalatable, too soft, and/or that exhibits blooming effects.

For example, fat bloom is believed to be based on either phase separation or polymorphism. Under phase separation, it is believed that the separation of triglycerides within the cocoa butter crystalline structure causes the fat bloom. Since cocoa butter is made of a diverse mix of triglycerides, each with its own unique melting point, some triglycerides may still be liquid at higher temperatures. These liquid triglycerides are forced to the surface of the chocolate and solidify in a stable form, thereby resulting in the blooming effect.

Under polymorphism, the fat bloom formation is believed to be related to the polymorphism of the cocoa butter. In particular, the blooming effects are believed to occur when lower melting forms of crystals transition to the most stable phase VI crystals. This typically occurs with the transition from phase IV to phase V crystals, although the transition from phase V to phase VI crystals also has the potential to produce blooming effects.

Regardless of the particular mechanism, the resulting fat bloom results in chalky appearances on the surface of the chocolate part. While such chocolate parts are still safe to eat, the chalky appearances reduce the aesthetic qualities of the chocolate parts, and may also potentially reduce the palatability of the resulting chocolate. As discussed below, the additive manufacturing system of the present disclosure is suitable for forming chocolate confections for consumer use and consumption that have minimal or no blooming effects. In particular, the system provides a thermal profile that maintains the temper of the chocolate material, thereby allowing the chocolate confections printed with the system to have phase V crystal chocolate.

While proper tempering to phase V crystal chocolate is suitable for minimizing or preventing blooming effects, chocolate also thickens exponentially over time at a constant shear rate and temperature (i.e., the viscosity increases over time). This provides another engineering challenge to printing chocolate confections in an additive manufacturing system. For example, FIG. 1 shows plot 10 of the viscosity of chocolate over time while being sheared at a constant shear rate (e.g., 1.0 seconds$^{-1}$) and while being maintained at a suitable tempering temperature (e.g., 86° F. to 88° F.). As shown, as a continuous shear is applied to the chocolate, the viscosity of the chocolate increases exponentially over time, as indicated by the increased slope of plot 10. This exponential increase in viscosity of the sheared chocolate is believed to be due to the crystallization of the cocoa butter into the phase V crystal form.

The particular viscosities and slopes of plot 10 may vary depending on the chocolate composition, the holding temperature, and the shear rate used. For example, since chocolate is a non-Newtonian fluid when melted, chocolate reduces in viscosity with an increase in applied shear rates. Thus, the baseline viscosities may be reduced by increasing the applied shear rate. However, for any constant shear rate and temperature, the chocolate will eventually thicken enough to no longer be extrudable in an additive manufacturing process. This point is indicated by viscosity threshold 12 in FIG. 1.

For suitable shear rates and temperatures for tempering the chocolate to form phase V crystal chocolate, the chocolate will thicken to viscosity threshold 12 within about 50 to about 60 minutes. In comparison, the time required to print a chocolate confection may exceed this time period. As such, in addition to providing a suitable tempering profile, the additive manufacturing system of the present disclosure is also configured to deal with the chocolate thickening phenomenon. As discussed below, the system includes a recirculation loop configured to re-temper the chocolate material during operation, thereby allowing the chocolate material to reside in the system for longer durations.

Figure 2:
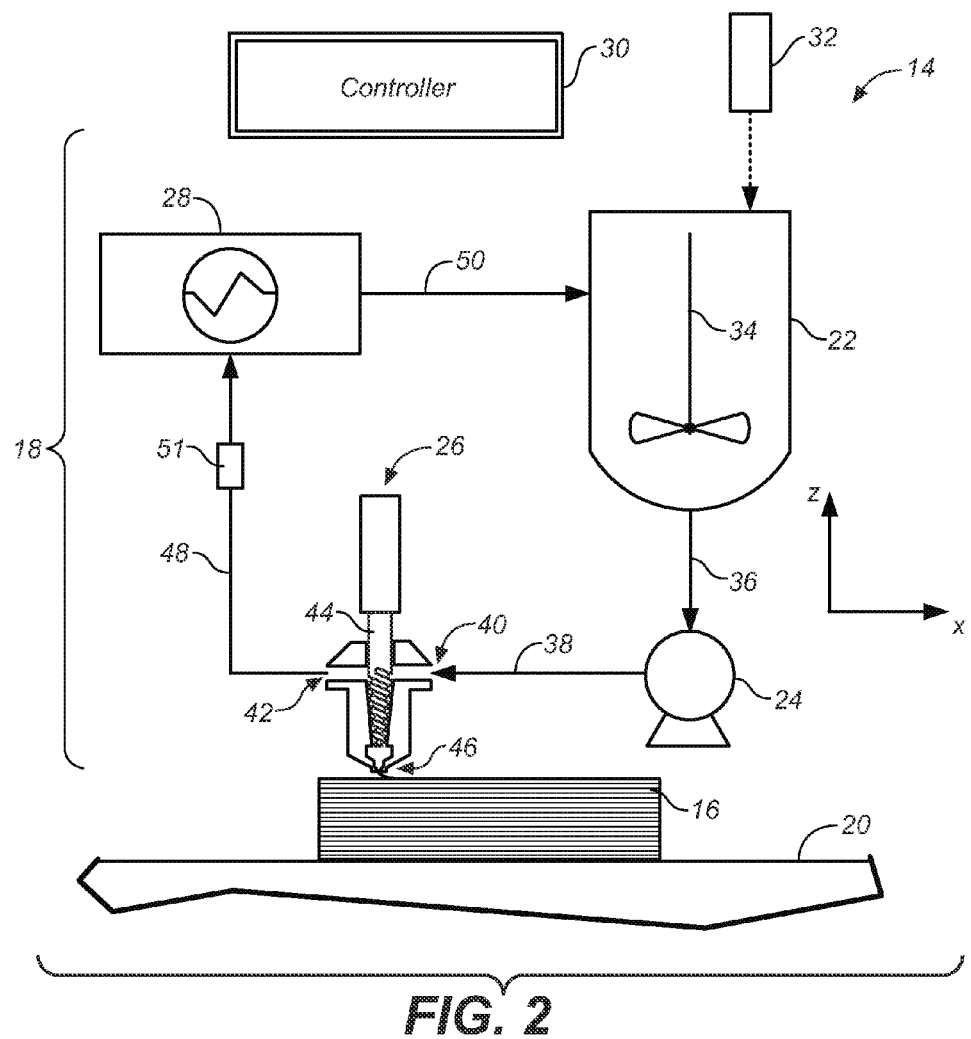
FIG. 2 is a block diagram of an additive manufacturing system of the present disclosure, which includes a tempering and re-tempering recirculation loop.

FIG. 2 is a block diagram of system 14, where system 14 is an example of a suitable additive manufacturing system of the present disclosure. System 14 is configured to print customized chocolate confections (e.g., confection 16) in a layer-by-layer manner from one or more chocolate materials. As shown, system 14 includes extrusion assembly 18 and platen 20, where extrusion assembly 18 defines a recirculation loop that is configured to melt and extrude a supply of the chocolate material onto platen 20 to form confection 16, while maintaining a temper of the chocolate material.

Extrusion assembly 18 includes shear tank 22, circulation pump 24, print head 26, and re-melter 28, which define a recirculation loop for the chocolate material. Platen 20, shear tank 22, circulation pump 24, print head 26, and re-melter 28 are each desirably connected to controller 30 of system 14 over one or more signal communication lines (not shown). Controller 30 is one or more computer-based controllers for operating system 14, and the signal communication line(s) may be physical wire connections and/or wireless connections. Accordingly, controller 30 may monitor and direct the operation of the components of system 14 with the use of sensors (e.g., thermocouples) and process control loops. In particular, controller 30 may receive instructions for printing chocolate confections (e.g., confection 16), and send commands to one or more components of system 14 (e.g., to print head 26) relating to the received instructions.

Shear tank 22 is a reservoir for receiving, heating, and shearing a supply of the chocolate material, such as from chocolate cartridge 32. Chocolate cartridge 32 is a supply of the chocolate material, which may be provided in a variety of different media (e.g., pellets, crumbs, bars, and the like). The amount of the chocolate material provided in chocolate cartridge 32 may also vary depending on the desired amounts needed for operation of system 14.

In one embodiment, the chocolate material in chocolate cartridge 32 includes tempered phase V crystal chocolate in a particulate media with small particle sizes. As discussed below, this allows the chocolate material from chocolate cartridge 32 to function as phase V crystal seeds in a re-tempering process. In an alternative embodiment, the chocolate material in chocolate cartridge 32 includes un-tempered chocolate or may include a blend of tempered and un-tempered chocolate.

Shear tank 22 is configured to shear and heat the received chocolate material at one or more elevated temperatures to render the chocolate material flowable, while also maintaining the temper of the chocolate material. Shear tank 22 includes mixing blade 34, which is configured to agitate and apply shear to the received chocolate material retained in shear tank 22, bringing the chocolate material to a flowable state. Suitable set point temperatures and shear rates for use in shear tank 22 include temperatures ranging from about 82° F. to about 90° F., more desirably from about 85° F. to about 87° F. (e.g., about 86° F.), and shear rates ranging from about 1.0 seconds$^{-1}$ to about 5.0 seconds$^{-1}$.

The sheared chocolate material may exit shear tank 22 through a bottom port and flows to circulation pump 24 through conduit 36. Circulation pump 24 is a fluid pump (e.g., a peristaltic pump) configured to pump the chocolate material received from shear tank 22 to print head 26, via conduit 38.

Print head 26 includes inlet port 40, outlet port 42, viscosity pump 44, and extrusion tip 46. Inlet port 40 is connected to conduit 38 for receiving the chocolate material from circulation pump 24. Outlet port 42 is an opposing opening from inlet port 40 for directing flow of unused chocolate material to conduit 48 for recirculation. Viscosity pump 44 is an auger-based pump configured to shear and drive successive portions of the chocolate material through extrusion tip 46. Suitable systems for viscosity pump 44 and extrusion tip 46 include those disclosed in Batchelder et al., U.S. Pat. Nos. 5,312,224 and 5,764,521.

The auger-based pump of viscosity pump 44 is a suitable design for extruding chocolate materials. For example, the pumping surfaces of viscosity pump 44 have mating tolerances that are larger than the average particles sizes of the chocolate material, which reduces the risk of mechanical seizing. Additionally, the compressed volume of the chocolate material in viscosity pump 44 is low, providing short response times. Furthermore, the pressure within viscosity pump 44 scales with viscosity of the chocolate material. As such, at least to the first order, the pumping characteristics of viscosity pump 44 do not change significantly as the viscosity of the chocolate material increases.

The unused chocolate material exits outlet port 42, and flows through conduit 48 to re-melter 28. Re-melter 28 is a heat exchanger configured to rapidly heat the unused chocolate material during a re-tempering process. As discussed below, in embodiments in which a batch re-tempering process is employed, re-melter 28 is configured to selectively alternative between a standard operating temperature (suitable for maintaining the temper of the unused chocolate material) and a higher liquefying temperature (suitable for fully melting the chocolate material). Alternatively, in embodiments in which a continuous re-tempering process is employed, re-melter 28 may be maintained at the liquefying temperature for fully melting the unused chocolate material. In an alternative embodiment, shear tank 22 and re-melter 28 may be provided as a single, integral component, where shear tank 22 may include a heat exchanger that is configured to heat the unused chocolate material during a re-tempering process.

Suitable liquefying temperatures for re-melter 28 include temperatures high enough to fully liquefy the chocolate material flowing through re-melter 28. Examples of suitable liquefying temperatures for re-melter 28 range from about 100° F. to about 110° F. (e.g., about 108° F.). The chocolate material flows from re-melter 28 back to shear tank 22 through conduit 50 for subsequent shearing and use.

The recirculation loop of extrusion assembly 18 allows the chocolate material to maintain its temper during a standard operation of system 14. Additionally, extrusion assembly 18 allows the chocolate material to be re-tempered, either in a batch re-tempering process or in a continuous re-tempering process, with the use of re-melter 28. In embodiments in which extrusion assembly 18 is configured to operate with a batch re-tempering process, the chocolate material may be heated and sheared in shear tank 22 at a first temperature for tempering (e.g., about 86° F.).

During standard operation (i.e., during a non-re-tempering process) circulation pump 24, print head 26, re-melter 28, and conduits 36, 38, and 48 are desirably maintained at an elevated temperature suitable keeping the chocolate material in a flowable state, while also maintaining the maintaining the temper of the chocolate material. For forming confection 16 from phase V crystal chocolate, suitable elevated temperatures range from about 85° F. to about 92° F., and desirably from about 87° F. to about 89° F. (e.g., about 88° F.). As such, during the standard operation, the chocolate material may be initially heated and sheared in shear tank 22 at a first temperature (e.g., at about 86° F.) and then slightly heated in circulation pump 24, print head 26, re-melter 28, and/or conduits 36, 38, and 48 to a second temperature (e.g., to about 88° F.) for circulation and extrusion.

Upon being extruded, the chocolate material used to print confection 16 may then slowly cool with the desired chocolate crystal phase. For phase V crystal chocolate, suitable cooling temperatures range from about 65° F. to about 75° F. (e.g., about 70° F.). Confection 16 may be printed in a layer-by-layer manner, where controller 30 directs print head 26 to move and deposit the chocolate material onto platen 20 along a series of tool paths for each layer. After being deposited, the chocolate material may slowly cool to a fully solidified state with phase V crystal chocolate. After being fully printed, confection 16 may then be cooled down to room temperature, and may undergo one or more additional post-printing processes (e.g., packaging).

The unused chocolate material in extrusion assembly 18 is circulated back to shear tank 22 for subsequent use. However, as discussed above, the chocolate material will eventually thicken over time due to the formation of phase V crystals within the recirculation loop. As such, prior to reaching viscosity threshold 12 (shown in FIG. 1), controller 30 desirably directs extrusion assembly 18 to undergo a re-tempering process to eliminate or otherwise reduce the increased viscosity in the chocolate material flowing through the recirculation loop.

Controller 30 may identify when a re-tempering process is required based on one or more inputs or criteria. For example, controller 30 may initiate a re-tempering process after predetermined durations in a build operation (e.g., after every 50 minute period). Alternatively, extrusion assembly 18 may also include one or more tempering meters, such as tempering meter 51 at conduit 48, configured to monitor the viscosity of the chocolate material flowing through the recirculation loop. For example, if controller 30 receives a signal from tempering meter 51 that the viscosity of the chocolate material has reached a given viscosity, desirably before viscosity threshold 12 is reached, controller 30 may then initiate a re-tempering process. While illustrated with a single tempering meter 51 at conduit 48, extrusion assembly 18 may alternatively include one or more tempering meters at different locations along the recirculation loop.

Controller 30 desirably initiates re-tempering processes at suitable points in the printing operation to minimize the impact on the resolution and quality of confection 16. For example, controller 30 may wait to initiate a re-tempering process until after a given layer of confection 16 is completed, rather than initiating the re-tempering process part way through the formation of the given layer.

During the re-tempering process, controller 30 may direct circulation pump 24 to stop pumping the chocolate material through the recirculation loop. At this point, controller 30 may also prevent print head 26 from extruding the chocolate material to reduce the risk of starving viscosity pump 44. After circulation pump 24 is stopped, controller 30 may direct re-melter 28 to heat up from the standard operating temperate (e.g., about 88° F.) to the liquefying temperature (e.g., about 108° F.). As discussed above, this liquefies the chocolate material in re-melter 28 to a state that substantially eliminates all chocolate crystals, initiating the re-tempering process.

Controller 30 may then direct circulation pump 24 to begin pumping the chocolate material through the recirculation loop. The portions of the chocolate material that enter re-melter 28 are rapidly heated to the liquefying temperature to remove the chocolate crystals, thereby providing a liquefied, non-crystalline, chocolate material. The liquefied chocolate material then flows back into shear tank 22 through conduit 50, where it is cooled down to the temperature in shear tank 22 (e.g., 86° F.) under the shear from mixing blade 34. In one embodiment, the entire recirculation loop may be heated to the liquefying temperature to ensure that all of the chocolate material flowing through the recirculation loop is liquefied. This reduces the risk of having portions of the chocolate material cooling to different phases.

Additionally, a suitable amount of tempered seeds of phase V crystal chocolate is desirably added to shear tank 22. As discussed above, in embodiments in which the chocolate material supplied in chocolate cartridge 32 includes tempered, phase V crystal chocolate, the chocolate material from chocolate cartridge 32 may be used as the tempered seeds. Alternatively, in embodiments, in which the chocolate material supplied in chocolate cartridge 32 includes un-tempered chocolate, a separate supply of tempered seeds of phase V crystal chocolate is desirably added to shear tank 22.

The addition of the tempered seeds, along with the cooling and shearing within shear tank 22, allows the cooling chocolate material to propagate phase V crystals. This propagation of the phase V crystals accordingly re-tempers the chocolate material within shear tank 22 as phase V crystal chocolate. The temperature and shearing within shear tank 22 also keeps the re-tempered chocolate material in a flowable state.

After a suitable amount of the chocolate material is liquefied in re-melter 28 to thin out the main melt pool, and to maintain the desired temper and rheological properties of the chocolate material, controller 30 may then drop the temperature set point of re-melter 28 back down to the standard operating temperature (e.g., about 88° F.). Examples of suitable amounts of liquefied chocolate material include at least about 10% by weight of the chocolate material in extrusion assembly 18, with particularly suitable amounts ranging from about 10% by weight to about 50% by weight of the chocolate material in extrusion assembly 18, and with even more particularly suitable amounts ranging from about 15% by weight to about 25% by weight of the chocolate material in extrusion assembly 18.

The cooler chocolate material flowing through the recirculation loop and ambient conditions eventually cool re-melter 28 back down to its set point temperature. To ensure that the chocolate material is able to cool down, system 14 is desirably retained in ambient conditions below about 90° F., and more desirably at or below the set point temperature (e.g., at room temperature). At this point, the temperatures in the recirculation loop are the same as they were prior to initiating the batch re-tempering process. However, a suitable amount of the chocolate material has now been re-tempered to allow the printing operation to continue. Accordingly, controller 30 may direct print head 28 to begin subsequent extrusions of the chocolate material to continue to print confection 16. This batch re-tempering process may then be repeated each time the viscosity of the chocolate material thickens beyond an acceptable viscosity.

In embodiments in which extrusion assembly 18 is configured to operate with a continuous re-tempering process, re-melter 28 may be maintained at the liquefying temperature (e.g., about 108° F.) during standard operation of system 14. In this embodiment, the chocolate material is fully melted each time it passes through re-melter 28. The melted chocolate material then flows back into shear tank 22 through conduit 50.

The chocolate material entering shear tank 22 from conduit 50 is desirably sheared and cooled from the liquefying temperature down to the flowable temperature (e.g., 86° F.) prior to being pumped to print head 26. During steady state flow, this may be accomplished by retaining a large amount of the chocolate material in shear tank 22 to provide a sufficient residence time in shear tank 22 for shearing and cooling the chocolate material.

In addition, tempered seeds of phase V crystal chocolate are desirably added to shear tank 22 in a continuous or intermittent manner. In embodiments in which the chocolate material supplied in chocolate cartridge 32 includes tempered, phase V crystal chocolate, the chocolate material from chocolate cartridge 32 may be used as the tempered seeds. Alternatively, in embodiments, in which the chocolate material supplied in chocolate cartridge 32 includes un-tempered chocolate, a separate supply of tempered seeds of phase V crystal chocolate is desirably added to shear tank 22.

As discussed above, the addition of the tempered seeds, along with the cooling and shearing within shear tank 22, allows the cooling chocolate material to propagate phase V crystals. This propagation of the phase V crystals accordingly re-tempers the chocolate material within shear tank 22 as phase V crystal chocolate. The temperature and shearing within shear tank 22 also keeps the re-tempered chocolate material in a flowable state.

The remaining stages of extrusion assembly 18 may then operate in the same manner as discussed above. The chocolate material may exit shear tank 22 and flow to print head 26 through conduit 36, pump 24, and conduit 38. The elevated temperatures of conduit 36, pump 24, conduit 38, and print head 26 allow the chocolate material to retain its flowable state, while also maintaining the temper of the chocolate material.

At print head 26, viscosity pump 44 may receive and extrude the re-tempered chocolate material to print the layers of confection 16, as discussed above. In comparison to the batch re-tempering process, however, the continuous re-tempering process allows print head 26 to continue to print confection 16 while the re-tempering process is ongoing. This is beneficial for reducing the overall time required to print chocolate confections, such as confection 16.

The unused chocolate material is circulated back to re-melter 28, where it is fully liquefied again for a subsequent re-tempering process, which may follow the same steps discussed above. As such, in this embodiment, the chocolate material may be re-tempered well in advance of reaching viscosity threshold 12 (shown in FIG. 1). Accordingly, the batch and continuous re-tempering processes are each suitable for reducing the viscosity of the chocolate material flowing through the circulation loop to levels that provide suitable flow and extrusion properties over multiple-hour operations.

In addition to re-tempering the chocolate material, the recirculation loop also prevents viscosity pump 44 of print head 26 from being starved of the chocolate material during starts and accelerations, such as when depositing a road of the chocolate material onto platen 20. At rest and low shear rates, the chocolate material effectively functions as a solid material. Thus, without the recirculation loop, when the auger-based pump of viscosity pump 44 begins to accelerate at the start of a tool path, the chocolate material initially resists flowing, which can starve print head 26, resulting in poorly shaped road beginnings. Additionally, as discussed below, the pressure within the recirculation loop may be controlled to adjust the feed rate of the chocolate material to viscosity pump 44. For example, if viscosity pump 44 is starved, the pressure within the recirculation loop may be increased. Alternatively, if viscosity pump 44 is leaking the chocolate material, the pressure within the recirculation loop may be decreased (e.g., a mild vacuum) to prevent further leakage or drippage.

The recirculation loop of extrusion assembly 18, however, allows the chocolate material to continuously flow through print head 26, even if viscosity pump 44 is not operating. This prevents the chocolate material from being at rest or low shear rates. Thus, when controller 30 directs viscosity pump 44 to draw the chocolate material from the recirculation loop, the chocolate material will not have to initially resist flowing. This prevents viscosity pump 44 from being starved during starts and accelerations.

In order to print custom-designed chocolates (e.g., confection 16), platen 20 and print head 26 are moveable relative to each other based on signals from controller 30. In one embodiment, platen 20 may move along the vertical z-axis, and print head 26 is moveable in the horizontal x-y plane. The horizontal x-y plane is a plane defined by an x-axis and a y-axis, where the x-axis, the y-axis, and the z-axis are orthogonal to each other. This is a typical design arrangement for systems developed by Stratasys, Inc., Eden Prairie, Minn. under the trademarks "FUSED DEPOSITION MODELING" and "FDM". In an alternative embodiment, print head 26 may move along the vertical z-axis, and platen 20 may be moveable in the horizontal x-y plane.

In a further alternative embodiment, print head 26 may be immobile within system 14. In this embodiment, platen 20 is configured to move in multiple directions in the x-y-z coordinate system. In another alternative embodiment in which print head 26 is fixed within system 14, platen 20 may be configured to move and pivot in multiple degrees of freedom (e.g., at least five degrees of freedom). As discussed below, this embodiment is beneficial for reducing or eliminating the need for support materials.

In some embodiments, extrusion assembly 18 and/or platen 20 may also be enclosed within a build chamber (not shown). In this embodiment, the environment of the build chamber may be maintained at ambient conditions (e.g., room temperature) or may be heated or cooled to one or more controlled temperatures (e.g., 70° F.). The use of controlled temperatures in the build chamber may be suitable to assist in maintaining the temper of the chocolate material, and may reduce distortions and curling of confection 16. The environment in the build chamber may be controlled in a variety of manners (e.g., with heated or refrigerated circulating air, heat lamps, and the like).

Figure 3:
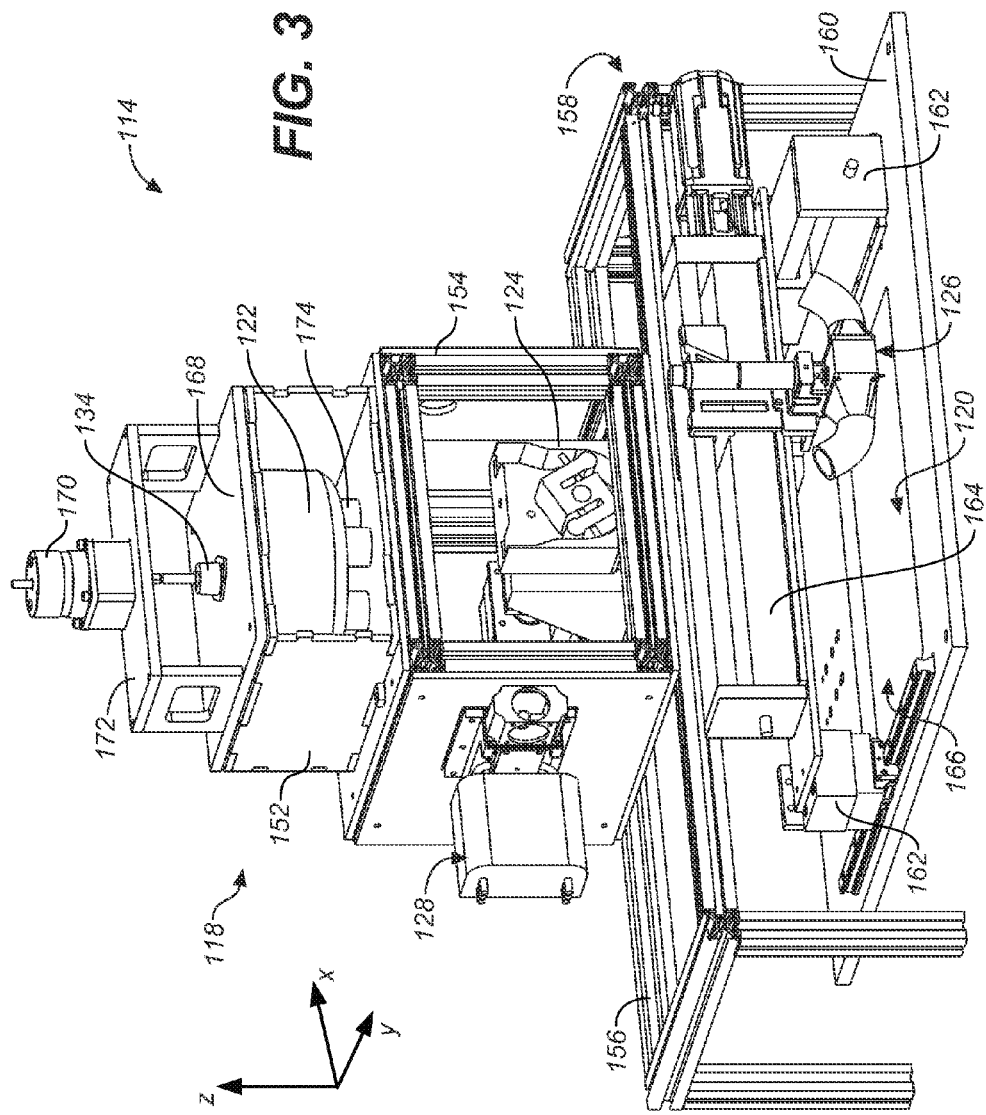
FIG. 3 is a front perspective view of the first embodied system.

FIGS. 3-10 illustrate system 114, which is an example of a suitable embodiment for system 14 (shown in FIG. 2), and where corresponding reference labels are increased by "100". As shown in FIG. 3, extrusion assembly 118 of system 114 includes shear tank 122, circulation pump 124, print head 126, and re-melter 128, where conduits 136, 138, 148, and 150 are omitted for ease of discussion. In the shown embodiment, shear tank 122 is retained within heating box 152, and circulation pump 124 is retained within heating box 154. Heating boxes 152 and 154 are enclosable chambers configured to receive heated air (or other gases or liquids) to maintain the elevated temperatures for shear tank 122 and circulation pump 124.

Re-melter 128 is mounted to a lateral surface of heating box 154, and heating box 154 is correspondingly supported by frame assembly 156. Frame assembly 156 is a structural component that may be retained within a build chamber (not shown) of the system.

Print head 126 is supported by x-y gantry 158, which is a guide-rail, gantry mechanism configured to move print head 126 in the horizontal x-y plane above platen 120. X-y gantry 158 includes gantry platform 160, y-axis rail mechanism 162, and x-axis rail mechanism 164, where gantry platform 160 is supported by the system and includes opening 166 through which print head 126 extends for depositing the chocolate material onto platen 120.

Print head 126 is operably suspended from x-axis rail mechanism 164, allowing print head 126 to move along the x-axis based on signals from the controller corresponding to controller 30 (not shown in FIG. 3). X-axis rail mechanism 164 is correspondingly supported by y-axis rail mechanism 162. Y-axis rail mechanism 162 is likewise supported by gantry platform 160, allowing print head 126 to move along the y-axis based on signals from the controller. Accordingly, in the shown embodiment, print head 126 is moveable relative to shear tank 122, circulation pump 124, and re-melter 128. As discussed below, to accommodate the movement of print head 126, the conduits 138 and 148 are desirably flexible (e.g., flexible tubing).

Shear tank 122 retains the main supply of the chocolate material for print head 126, maintains the chocolate material at a desired temperature (e.g., 86° F.), and continuously agitates and shears the chocolate material to keep the chocolate material in a flowable state. Shear tank 122 may have a suitable volume for retaining the chocolate material (e.g., a two-quart container), and is derived from one or more materials that are thermally and dimensionally stable. For example, shear tank 22 may be an aluminum container coated with a non-stick coating (e.g., polytetrafluoroethylene available under the trade designation "TEFLON" from E.I. du Pont de Nemours and Company, Wilmington, Del.).

Shear tank 122 also includes lid 168 located at a top opening of heating box 152, where lid 168 provides access to shear tank 122 for supplying additional chocolate cartridges 32 (shown in FIG. 2). The chocolate material is agitated and sheared with mixing blade 134, which is axially connected to motor 170. Mixing blade 134 includes a shaft portion (e.g., a stainless-steel shaft) and a paddle portion (not shown) derived from one or more metallic and/or polymeric materials (e.g., low-density polyethylene). The paddle portion may also include one or more scrapers (not shown) configured to prevent layers of stagnant chocolate material from being formed on the sides and bottom of shear tank 122.

In the shown embodiment, the shaft portion of mixing blade 134 extends through an opening in lid 168 with a shaft seal and bearing arrangement, allowing lid 168 to be closed over shear tank 122 during operation. This sealing of shear tank 122 provides two functions. First, it thermally insulates shear tank 122 and supports mixing blade 134. Additionally, it provides an air tight seal that allows the recirculation loop, including shear tank 122, to be placed under a slight vacuum to help balance pressures in print head 126, as discussed below.

Motor 170 is a mixing motor, such as a brushless, three-phase, direct-current motor with gearbox, axially coupled to the shaft portion of mixing blade 134. Motor 170 is supported above shear tank 122 and heating box 152 by frame structure 172, where frame structure 172 is supported by heating box 152. This arrangement allows motor 170 to be external to heating box 152, thereby preventing motor 170 from being subjected to the elevated temperature of heating box 152. Shear tank 122 may also include one or more thermocouples (not shown) configured to monitor the temperature of the chocolate material retained within shear tank 122.

Heating box 152 is an enclosable container configured to create an enclosed volume for the heated air to flow and evenly warm shear tank 122. Shear tank 122 is supported within heating box 152 on standoffs 174 to reduce conductive heat transfer between shear tank 122 and heating box 152. Heating box 152 may also include one or more thermocouples (not shown) configured to monitor the temperature of the air flow within heating box 152.

Figure 4:
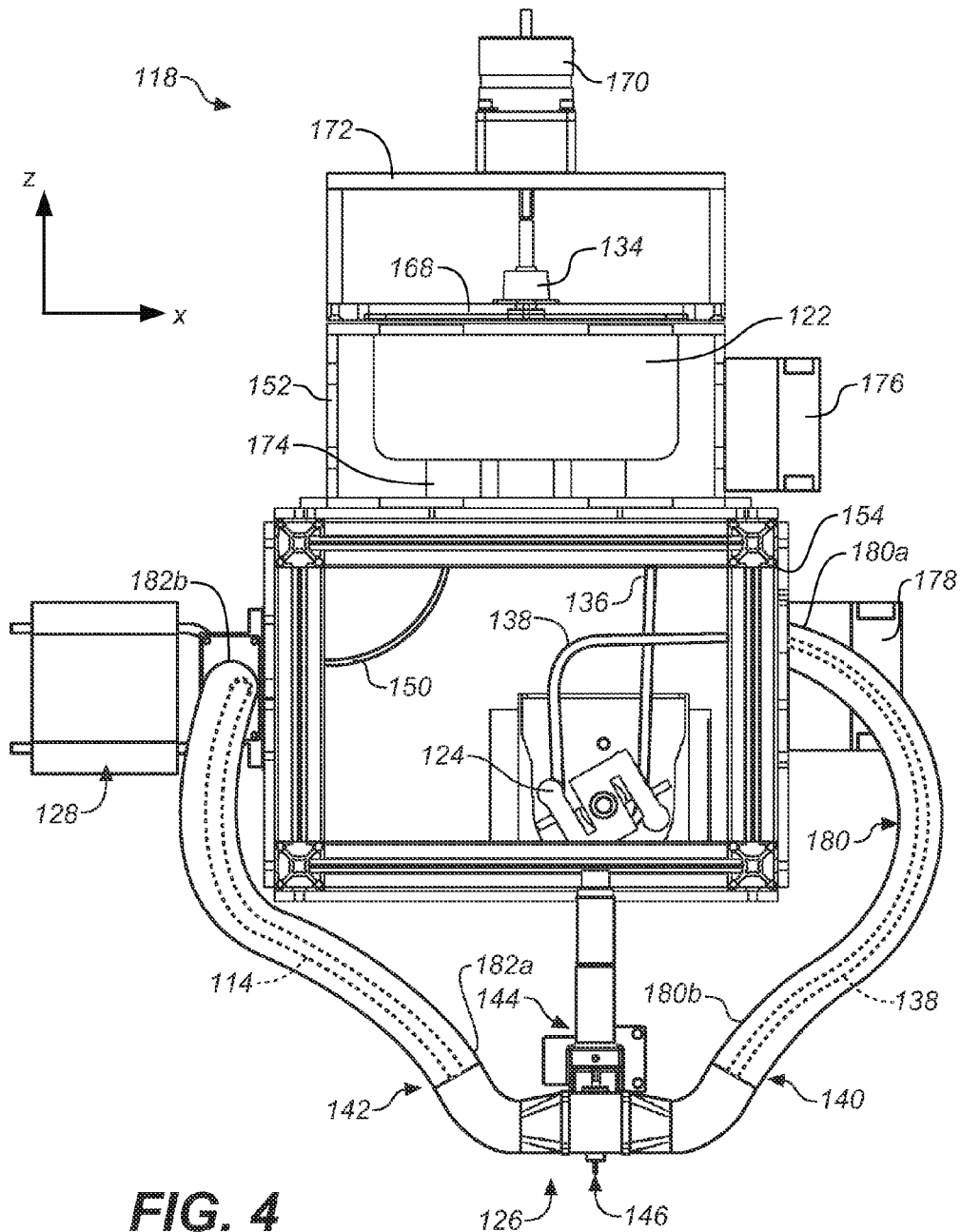
FIG. 4 is a front view of the first embodied system.

FIG. 4 further illustrates extrusion assembly 118 with conduits 136, 138, 148, and 150, but with frame assembly 156 and gantry 158 omitted for ease of discussion. As shown, heating box 152 is heated with heater 176, which is a fan-based heating unit configured to blow heated air into heating box 152. An example of a suitable heating unit for heater 176 includes a 40-millimeter fan attached to a coiled heater element, which may be controlled by the controller (not shown). The heated air may exit heating box 152 through one or more exit vents (not shown). In alternative embodiments, heating box 152 may be heated with a variety of different heating units configured for introduce heated fluids (e.g., gases or liquids) into heating box 152. For example, heating box 152 may alternatively receive a heated liquid (e.g., water), which heats shear tank 122 and may be circulated in a heat exchange loop.

Additionally, heating box 152 includes one or more floor openings (not shown) to receive conduits 136 and 150, where conduits 136 and 150 extend upward from heating box 154, through heating box 152, and into shear tank 122 to circulate the chocolate material. Heating box 154 correspondingly includes one or more ceiling openings (not shown) to pass conduits 136 and 150 upward into heating box 152. Heating box 154 also includes a first lateral opening (not shown) to provide access for conduit 138 to print head 126, and a second lateral opening (not shown) to provide access to conduit 150 from re-melter 128.

Heating box 154 is heated with heater 178, which is a fan-based heating unit configured to blow heated air into heating box 154 in the same manner as heater 176 for heating box 152. An example of a suitable heating unit for heater 178 includes an 80-millimeter fan attached to a coiled heater element, which may be controlled by the controller. Heating box 154 desirably does not include vents to exhaust the heated air. Instead, as discussed below, the heated air flowing through heating box 154 desirably follows the path of the chocolate material to print head 126 and re-melter 128, at which point the heated air may be vented.

In alternative embodiments, heating box 154 may also be heated with a variety of different heating units configured for introduce heated fluids (e.g., gases or liquids) into heating box 154. For example, heating box 154 may alternatively receive a heated liquid (e.g., water), which may heat the chocolate material flowing through conduit 138, print head 126, conduit 148, and to re-melter 128, and may also be circulated in a heat exchange loop. Heating box 154 may also include one or more thermocouples (not shown) configured to monitor the temperature of the air flow within heating box 154. Correspondingly, conduits 136 and 138 may each also include one or more thermocouples (not shown) configured to directly monitor the temperatures of the chocolate material flow through them.

Circulation pump 124 is located below shear tank 122, within heating box 154. While illustrated as a peristaltic pump, circulation pump 124 may alternatively be any suitable pump for driving a flow of the chocolate material to print head 126 and through the recirculation loop. In alternative embodiments, extrusion assembly 118 may include multiple circulation pumps corresponding to circulation pump 124 throughout the various stages of the recirculation loop to assist in pumping the flow of the chocolate material.

Circulation pump 124 is driven by a motor (not shown), which may be mounted outside of heating box 154, thereby preventing the motor from being subjected to the elevated temperature of heating box 154. The motor desirably receives signals from the controller to direct the rate at which circulation pump 124 pumps the chocolate material to print head 126.

In the shown embodiment, conduits 136 and 138 are derived from the same tubing for use in circulation pump 124. Examples of suitable tubing for conduits 136 and 138 include rubber tubing having an 8-millimeter inner diameter and with a 2.3-millimeter wall thickness. The first end of the tubing (i.e., conduit 136) extends from shear tank 122, through heating boxes 152 and 154, to circulation pump 124. The second end of the tubing (i.e., conduit 138) extends from circulation pump 124, through heating box 154, and to inlet port 140 of print head 126. In alternative embodiments, conduits 136 and 138 may be derived from different materials, and may be separate tubes that engage circulation pump 126 within heating box 154.

Conduit 138 is desirably fully encased within outer tube 180 between heating box 154 and print head 126. Outer tube 180 is a first flexible tube (e.g., a 1.25-inch inner diameter tube) derived from one or more metallic and/or polymeric materials, and has first end 180a that is connected and sealed to a lateral wall of heating box 154, and second end 180b that is connected and sealed to inlet port 140 of print head 126. Outer tube 180 provides a suitable mechanism for relaying the heated air (or other gas or liquid) from heating box 154 to print head 126, thereby providing uniform heating of the chocolate material as the chocolate material flows through conduit 138 from heating box 154 to print head 126.

On the other side of print head 126, conduit 148 extends from outlet port 142 of print head 126 to re-melter 128. Conduit 148 may also be derived from the same type of tubing as conduits 136 and 138. Conduit 148 is also desirably fully encased within outer tube 182 between print head 126 and re-melter 128. Outer tube 182 is a second flexible tube (e.g., a 1.25-inch inner diameter tube) derived from one or more metallic and/or polymeric materials, and has first end 182a that is connected and sealed to outlet port 142 of print head 126, and second end 182b that is connected and sealed to re-melter 128, as discussed below.

Outer tube 182 provides a suitable mechanism for relaying the heated air (or other gas or liquid) from print head 126 to re-melter 128, thereby providing uniform heating of the chocolate material as the chocolate material flows through conduit 148 from print head 126 to re-melter 128. Accordingly, the arrangement of extrusion assembly 118 allows the heated air (or other gas or liquid) introduced to heating box 154 to flow through outer tube 180, print head 126, and outer tube 182 to re-melter 128. This allows the chocolate material to maintain a desired, uniform temperature (e.g., about 88° F.) while flowing through circulation pump 124, conduit 136, print head 126, and conduit 148. This accordingly allows the chocolate material entering print head 126 to remain in a flowable state, while also maintaining the temper of the chocolate material.

Figure 5:
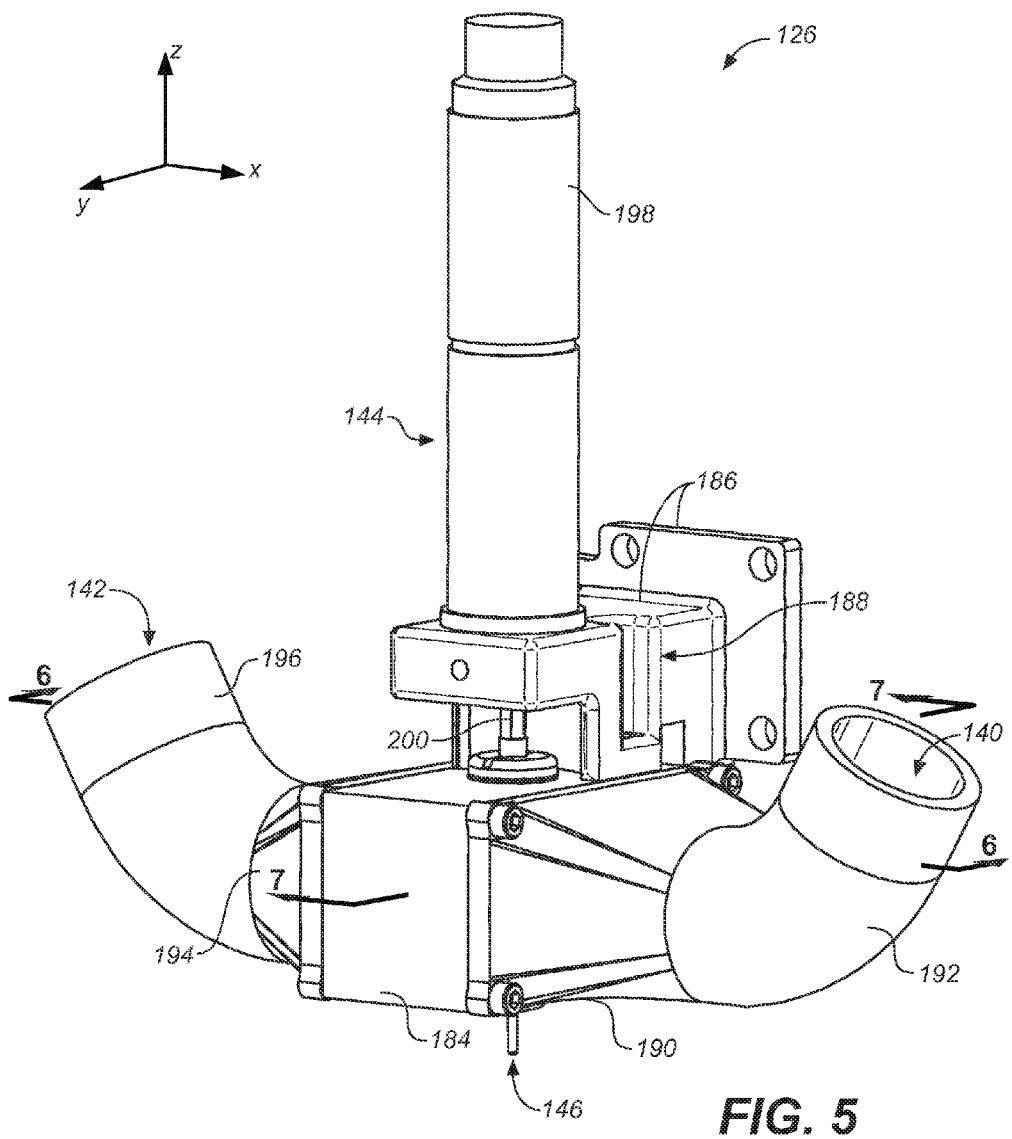
FIG. 5 is a front perspective view of a print head of the first embodied system.

FIG. 5 illustrates print head 126, which further includes print head body 184 and carriage block 186, where carriage block 186 is secured to print head body 184 via bolt holes 188, and is configured to be secured to x-axis gantry mechanism 164 (shown in FIG. 3). Print head body 184 is secured to inlet port 140 and outlet port 142, where inlet port 140 and outlet port 142 are secured to opposing sides of print head body 184 to provide a pathway for recalculating the chocolate material and for directing the heated air.

Inlet port 140 includes base section 190 integrally formed with coupling tube 192, and may be fabricated from one or more metallic and/or plastic materials. Base section 190 is the portion of inlet port 140 that is securable to print head body 184 and has a cross section that increases from coupling tube 192 to print head body 184. Coupling tube 192 provides a suitable location for securing second end 180b of outer tube 180 (shown in FIG. 4), where conduit 138 (shown in FIG. 4) extends through the opening of coupling tube 192.

Similarly, outlet port 142 includes base section 194 integrally formed with coupling tube 196, and may also be fabricated from one or more metallic and/or plastic materials. Base section 194 is the portion of outlet coupling 142 that is securable to print head body 184 and has an expanding cross section from coupling tube 196 to print head body 184. Coupling tube 196 provides a suitable location for securing first end 182a of outer tube 182 (shown in FIG. 4), where conduit 148 (shown in FIG. 4) extends through the opening of coupling tube 196.

Print head body 184 may be fabricated from one more metallic and/or plastic materials configured to withstand the elevated temperatures required to extrude the chocolate material (e.g., aluminum). Print head body 184 retains viscosity pump 144, where, in the shown embodiment, viscosity pump 144 includes drive motor 198, drive shaft 200, and an auger-based pump (not shown in FIG. 5) configured to shear and drive successive portions of the chocolate material through extrusion tip 146. As discussed above, suitable systems for viscosity pump 144 and extrusion tip 146 include those disclosed in Batchelder et al., U.S. Pat. Nos. 5,312,224 and 5,764,521. As shown in FIG. 5, these suitable designs are modified to allow the unused chocolate material and heating air to pass through print head 126 for circulation through extrusion assembly 118.

Figure 6:
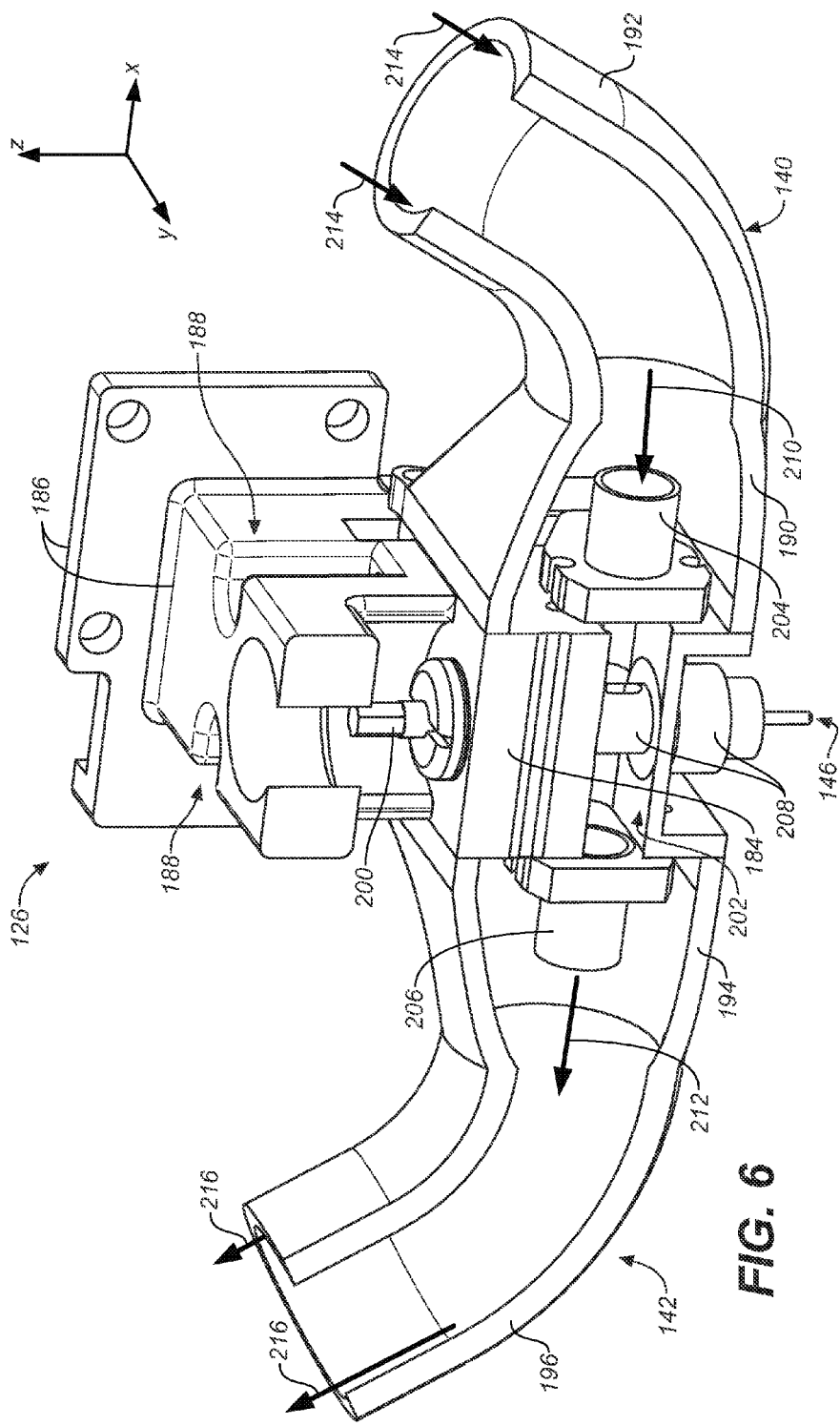
FIG. 6 is a sectional view of Section 6-6 taken in FIG. 5.

FIG. 6 is a sectional view of Section 6-6 taken in FIG. 5, where drive motor 198 is omitted for ease of discussion. As shown in FIG. 6, print head body 184 also includes flow channel 202 disposed between conduit couplings 204 and 206, where conduit couplings 204 and 206 are secured to print head body 184 at opposing sides of flow channel 202. Conduit coupling 204 is an inlet connector disposed coaxially within base section 190 of inlet port 140, and provides a suitable location for connecting conduit 138 (shown in FIG. 4) to print head 126. Similarly, conduit coupling 206 is an outlet connector disposed coaxially within base section 194 of outlet port 142, and provides a suitable location for connecting conduit 148 to print head 126.

In the shown embodiment, the auger-based pump of viscosity pump 144 (referred to as auger pump 208), extends through print head body 184 with a top end engaged with drive shaft 200, and a bottom end coupled to extrusion tip 146. As such, auger pump 208 extends through flow channel 202 to receive the supply of the chocolate material as the chocolate material passes through flow channel 202. Flow channel 202 desirably has cross-sectional dimensions that are greater than those of auger pump 208 to allow excess flow of the chocolate material to pass around auger pump 208.

This arrangement of print head 126 allows the chocolate material to flow into flow channel 202 from conduit 138 and conduit coupling 204 (as illustrated by arrow 210). While flowing through flow channel 202, a portion of the chocolate material may enter auger pump 208 to be driven and extruded from extrusion tip 146 pursuant to the commands from the controller. The extruded chocolate material may then be deposited as roads onto platen 120 to print a custom-designed chocolate confection (e.g., confection 16, shown in FIG. 2) in a layer-by-layer manner, as discussed above. The remaining unused chocolate may flow around auger pump 208 and out of flow channel 202 and conduit connector 206 into conduit 148 (as illustrated by arrow 212).

Figure 7:
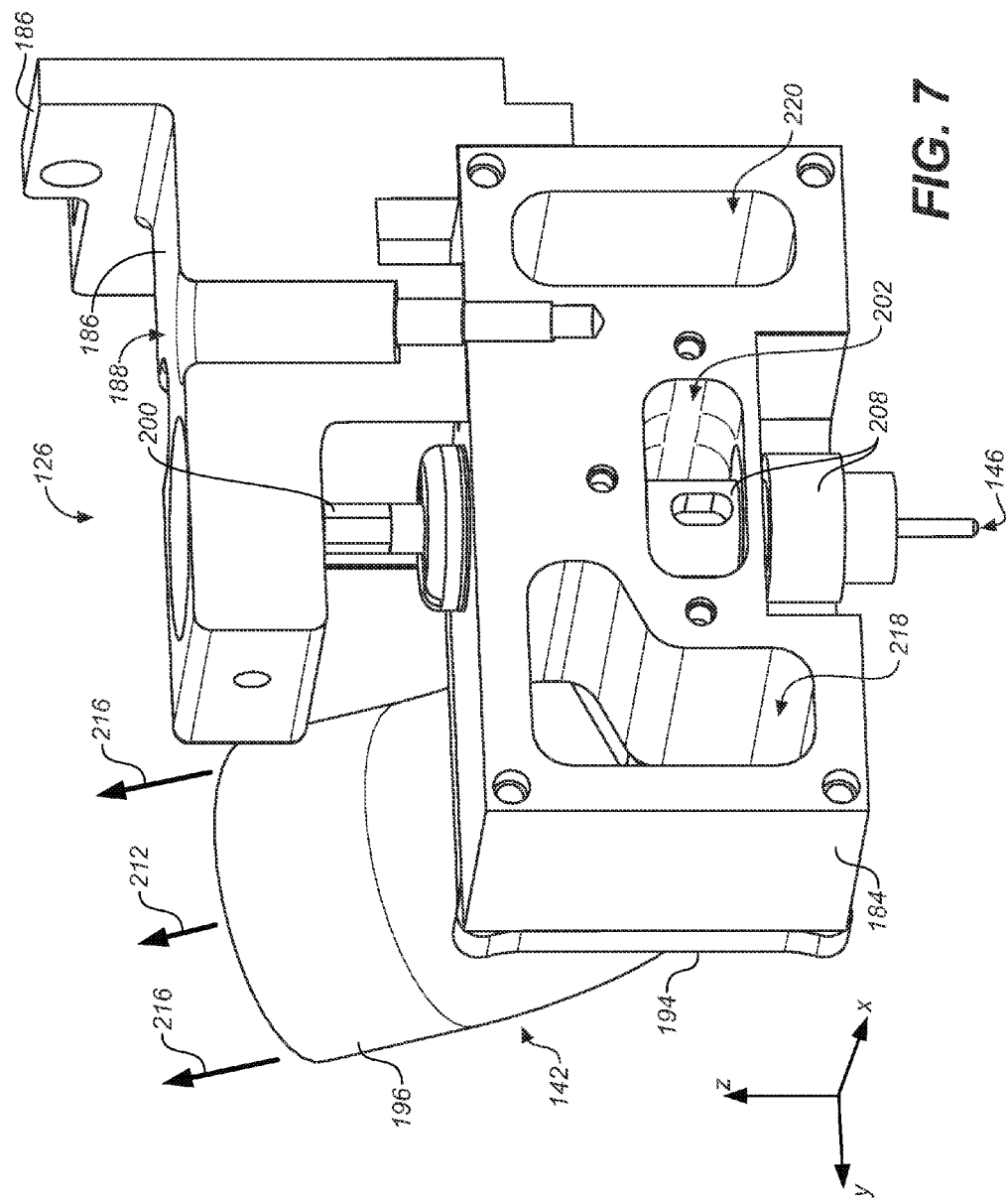
FIG. 7 is a sectional view of Section 7-7 taken in FIG. 5.

The heated air from outer tube 180 may flow through inlet port 140, around conduit 138 (as illustrated by arrows 214). The heated air then bypasses around flow channel 202 and exits outlet coupling 142 to outer tube 182 (as illustrated by arrows 216). This is further illustrated in FIG. 7, which is a sectional view of Section 7-7 taken in FIG. 5. As shown in FIG. 7, print head body 184 also includes manifolds 218 and 220, which are channels through print head body 184 on opposing sides of flow channel 202. Manifolds 218 and 220 interconnect inlet port 140 and outlet port 142, thereby allowing the heated air flowing through print head 126 to bypass flow channel 202. This allows the heated air to also provide heat to print head 126.

In some embodiments, print head 126 may also include one or more additional heating systems to control the temperature and flow characteristics of the chocolate material. For example, print head 126 may also include one or more conductive heaters (not shown) mounted adjacent to auger pump 208, which may be monitored and controlled by the controller with one or more thermocouples (not shown).

Figure 8:
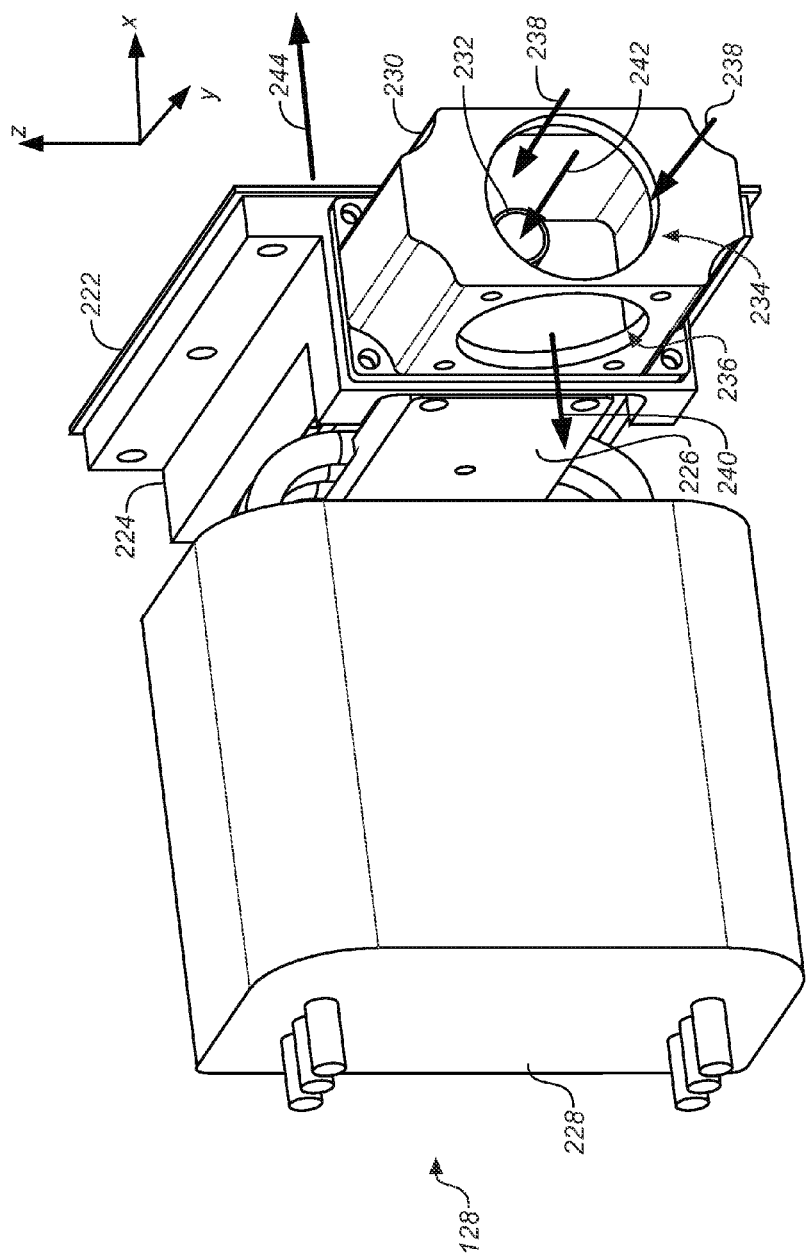
FIG. 8 is a front perspective view of a re-melter of the first embodied system.
Figure 9:
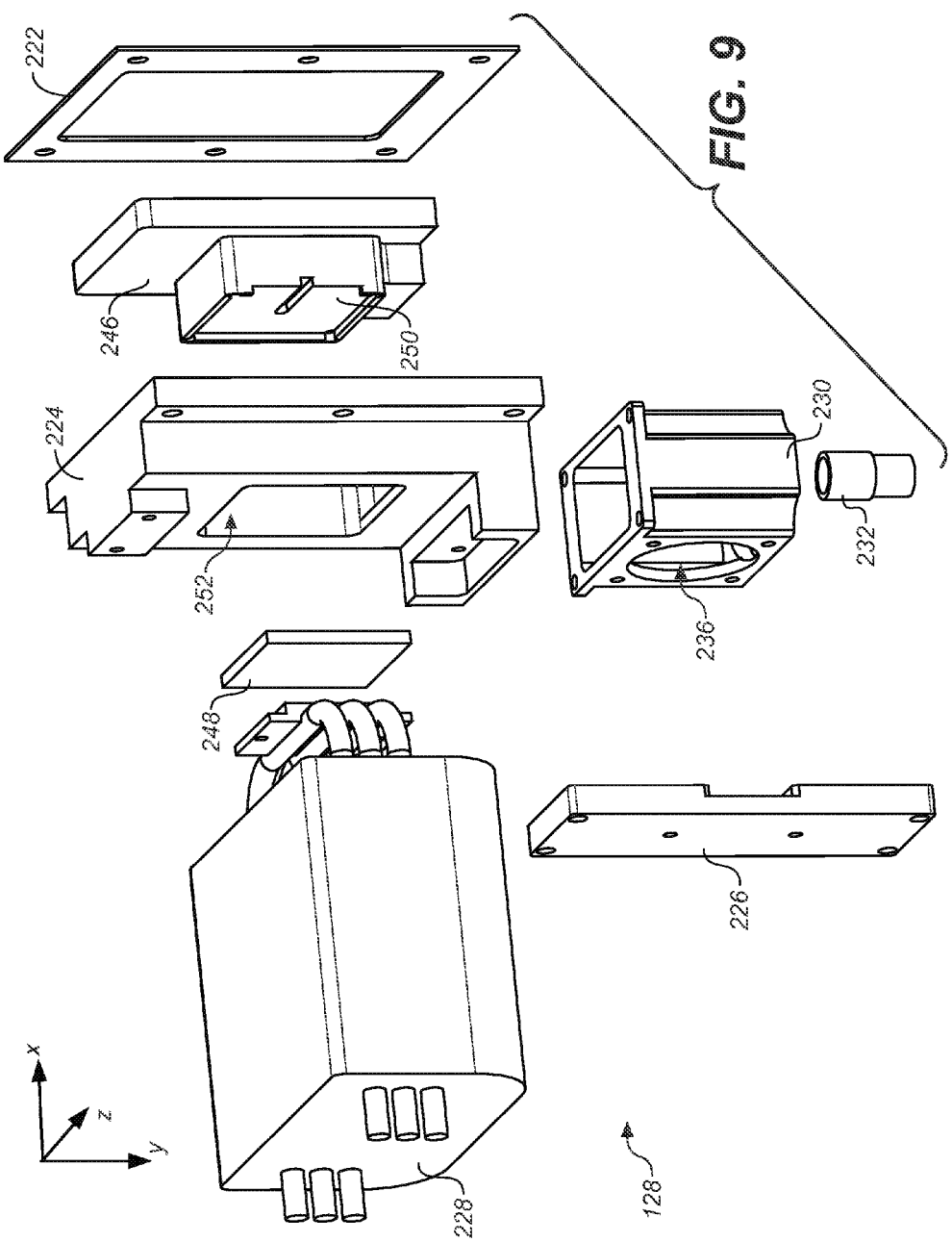
FIG. 9 is an exploded top perspective view of the re-melter.
Figure 10:
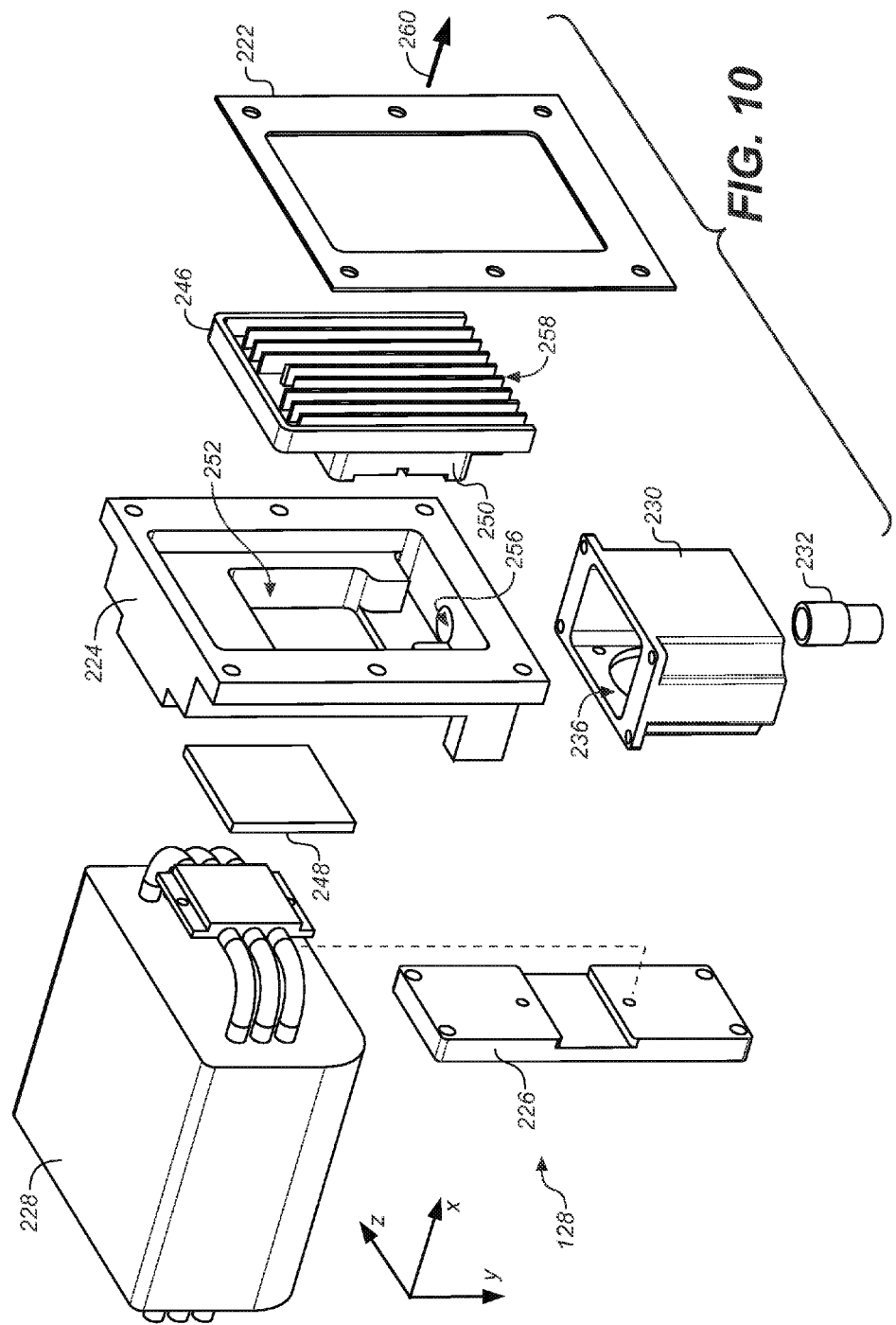
FIG. 10 is an exploded bottom perspective view of the re-melter.

The unused chocolate material and heated air that travel from print head 126 through conduit 148 and outer tube 182 are directed to re-melter 128, which is further illustrated in FIGS. 8-10. As shown in FIG. 8, re-melter 128 includes retaining bracket 222, housing block 224, cover 226, heat sink 228, vent coupling 230, and conduit nipple 232. Base block 224 is secured to retaining bracket 222, which is correspondingly secured and sealed to the lateral wall of heating bock 154 (shown in FIGS. 3 and 4). Heat sink 228 is also secured to housing block 224 with cover 226. Vent coupling 230 and conduit nipple 232 are secured to a front surface of housing block 224 such that vent coupling 230 extends coaxially around conduit nipple 232.

Vent coupling 230 includes inlet opening 234 and vent opening 236, where inlet opening 234 is a suitable location for securing and sealing second end 182b of outer tube 182 (shown in FIG. 4) to re-melter 128. This allows the heated air flowing through outer tube 182 to enter vent coupling 230 coaxially around conduit 148, as illustrated by arrows 238. Vent opening 236 correspondingly allows the heated air to vent from extrusion assembly 118, as illustrated by arrow 240. In an alternative embodiment, vent opening 236 may be connected by one or more manifolds to heating box 154 and/or heater 178 (shown in FIG. 4) to recycle the heated air back to heating box 154.

Conduit nipple 232 is a suitable location for securing and sealing conduit 148 to re-melter 128. This allows the unused chocolate material to flow into re-melter 128, as illustrated by arrow 242. The chocolate material then flows through re-melter 128 and exits into conduit 150 (shown in FIG. 4), as illustrated by arrow 244.

FIG. 9 is an exploded top perspective view of re-melter 128, which further illustrates heat exchange block 246 and thermoelectric cooler 248 of re-melter 128. As shown, heat exchange block 246 is secured between retaining bracket 222 and housing block 224. Heat exchange block 246 is thermally-conductive block (e.g., an aluminum block) that includes extension member 250. Extension member 250 extends through opening 252 in housing block 224 and provides a mounting surface for receiving thermoelectric cooler 248. This secures thermoelectric cooler 248 between heat sink 228 and heat exchanger block 246.

Thermoelectric cooler 248 is a solid state heat pump that transfers thermal energy from one face to the other when current is applied. Thermoelectric cooler 248 can operate as either a heater or cooler depending on the direction of the current with a fast response time. Heat sink 228 accordingly assists in dissipating waste energy from thermoelectric cooler 248 when in cooling mode.

FIG. 10 is an exploded bottom perspective view of re-melter 128. As shown, housing block 224 also includes channel 256, and heat exchange block 246 also includes ribbed base portion 258, opposite of extension member 250. Channel 256 is an opening through housing block 224 that is aligned with conduit nipple 232 for allowing the chocolate material to flow into re-melter 128. When heat exchange block 246 is secured within housing block 224, port 256 directs the flowing chocolate material to the ribbed base portion 258.

Furthermore, when re-melter 128 is secured to the lateral wall of heating box 154 (shown in FIGS. 3 and 4), a sealed and enclosed region is created between ribbed base portion 258 and the lateral wall of heating box 154, bordered by retaining bracket 222. The chocolate material entering re-melter 128 flows from channel 256 to the region between ribbed base portion 258 and the lateral wall of heating box 154. The rib members of ribbed base portion 258 define channels through which the chocolate material flows to increase the contact surface area between heat exchange block 246 and the chocolate material. The chocolate material correspondingly exits re-melter 128 through the opening in the lateral wall of heating box 154 (as illustrated by arrow 260), which is connected and sealed to conduit 150.

As discussed above, re-melter 128 is suitable for rapidly liquefying the chocolate material during a batch or continuous re-tempering process. For example, during a batch re-tempering process, the controller may direct thermoelectric cooler 248 to transfer thermal energy to heat exchange block 246 to rapidly heat the received chocolate material from the standard operating temperature (e.g., about 88° F.) to the liquefying temperature (e.g., about 108° F.) within a short duration (e.g., within about 20-40 seconds). When the re-tempering process is completed, the controller may lower the set point temperature for thermoelectric cooler 248 back down to the standard operating temperature (e.g., about 88° F.).

The combination of re-melter 128 and the addition of the phase V seed crystals to shear tank 122 during the re-tempering process is suitable for re-tempering the chocolate material for extended periods of uses. Each re-tempering process is suitable for returning the viscosity of the chocolate material back to an acceptable state for use in extrusion assembly 118. Additionally, the design of re-melter 128 shown in FIGS. 8-10 also provides efficient heat transfer and does not cause significant amounts of flow resistance in the recirculation loop. Moreover, the compact and modular design of re-melter 128 allows for easy disassembly for cleaning and maintenance.

In one embodiment, system 114 may also include a vacuum arrangement to compensate for the open-system design of auger pump 208. Circulation pump 124 generates a positive pressure in the recirculation loop to pump the chocolate material. As such, pressure control is desired to make sure that fluids are not forced through auger pump 208, causing unwanted fluid leakage or drippage. For example, the chocolate material may be pumped to print head 126 with pressures ranging from about 5 pounds-square inch (psi) to about 10 psi above ambient. In comparison, auger pump 208 in print head 126 may only be configured to resist about 2 psi of pressure without leaking. As such, this pressure differential may cause the chocolate material to drip from extrusion tip 146 when auger pump 208 is not operated.

The leakage or drippage from auger pump 208 may be reduced or prevented using one or more of several techniques. First, the lengths of conduits 136 and 138 are desirably minimized, and the diameters of conduits 136 and 138 are desirably maximized to reduce the pressure required to pump the chocolate material. However, in the shown embodiment in which print head 126 is configured to move in the horizontal x-y plane, conduits 136 and 138 are required to have a minimum length and maximum diameter to maintain their flexibility and reach to accommodate the movement of print head 126.

Second, auger pump 208 may have a shallower angle, and extrusion tip 146 may have a smaller inner diameter. However, each of the parameters have minimum values as well to allow the chocolate material to be effectively extruded in a desired pattern.

Third, a slight vacuum may be applied to the recirculation loop to balance the pressure in the recirculation loop with the ambient pressure. For example, a vacuum line may be connected to shear tank 122 to balance and reduce the internal loop pressure to one which auger pump 208 is compatible with. A suitable vacuum line for use with extrusion assembly 118 includes a venturi vacuum pump coupled to a buffer tank, vacuum sensor, and a vacuum regulator.

As discussed above, system 114 is suitable for printing customized chocolate confections from chocolate materials, where the chocolate material crystallizes to phase V crystal chocolate. The recirculation loop of extrusion assembly 118 is efficient for providing a tempered and sheared flow of the chocolate material to print head 126. Furthermore, re-melter 128 allows the chocolate material to be re-tempered during a print operation, thereby preventing the flow of the chocolate material from thickening beyond its viscosity threshold.

Figure 11:
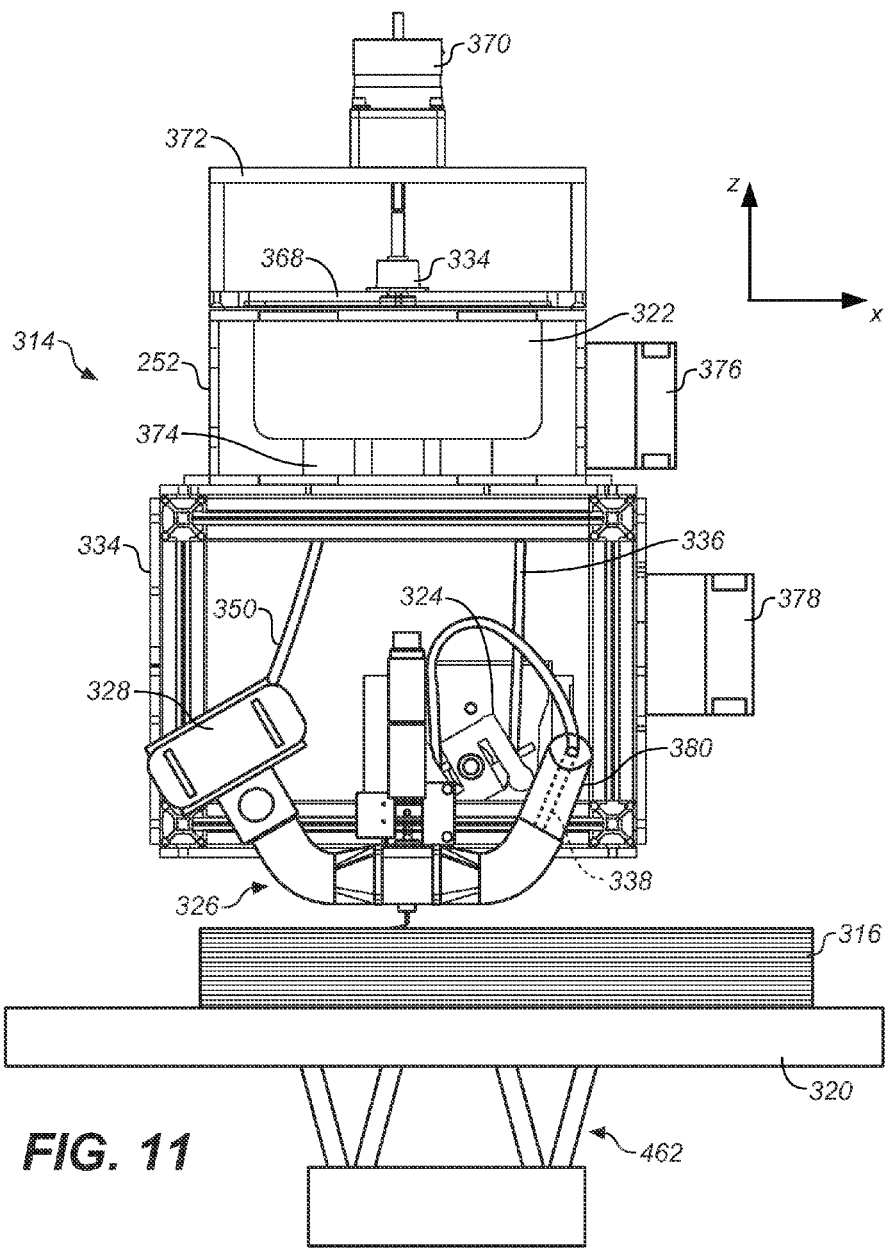
FIG. 11 is a front view of an alternative additive manufacturing system of the present disclosure, which includes an immobile print head.

FIG. 11 illustrates system 314, which is an example of a suitable alternative embodiment to system 14 (shown in FIG. 2) and system 114 (shown in FIGS. 3-10), and where corresponding reference labels are increased by "100" from those of system 114 (i.e., increased by "300" from those of system 14). In this embodiment, print head 326 is immobile (e.g., secured to heating box 354). Rather, platen 320 is configured to move relative to the fixed print head 326 with the use of platen gantry 462, based on signals from the controller. For example, platen gantry 462 may move platen 320 in along the x-axis, y-axis, z-axis, and combinations thereof to move platen 320 in any direction in the x-y-z Cartesian coordinate system.

Alternatively, platen gantry 462 may reposition platen 320 with one or more rotational movements to increase the degrees of freedom of movement for platen 320. For example, in addition to moving platen 320 in any directions along the x-axis, y-axis, z-axis, platen gantry 426 may function as a gimbal mount to also rotate platform 320 around x-axis and the y-axis. This allows platen 320 to orient confection 316 such that the layers of confection 316 are always being built upward along the vertical z-axis.

In another example, platen 320 and platen gantry 462 may function as a parallel robot platform movement in the horizontal x-y plane, as well as limited rotation about the x-axis and the y-axis using arms having concurrent prismatic or rotary joints. This consolidated parallel robot platform may be move upward and downward along the vertical z-axis with the use of an additional gantry mechanism.

Providing platen 320 with five or more degrees of freedom effectively allows system 314 to build confection 316 having overhanging and hollow regions without requiring the use of support materials. Additionally, the fixed arrangement of print head 326 allows extrusion assembly 318 to be located above a build chamber containing platen 320, thereby reducing the number of components residing within the build chamber or environment.

Moreover, fixing print head 326 allows short and rigid conduits with large diameters to be used to relay the chocolate material between heating box 354, print head 326, and re-melter 328. This reduces the pressure generated in the recirculation loop relative to ambient conditions, thereby precluding or reducing the need for a vacuum to be drawn through the recirculation loop. The reduced pressure within the recirculation loop accordingly reduces the risk of having the chocolate material drip from print head 126 during non-extrusion periods.

For example, as shown in FIG. 11, conduit 338 and outer tube 380 may have substantially reduced lengths and greater diameters (or other cross sections) to reduce flow resistance. As further shown, re-melter 328 may be positioned to preclude the need for conduit 348 and outer tube 382. Other similar arrangements may also be used, such that the overall volume of extrusion assembly 318 may be more compact and portable compared to extrusion assembly 118.

The additive manufacturing systems of the present disclosure (e.g., systems 14, 114, and 314) are suitable for printing customized chocolate confections, where the chocolate confections have phase V crystal chocolate. The resulting edible chocolate confections may be used for a variety of commercial, industrial, and consumer uses, such as for personalized gifts (e.g., holiday, birthday, and celebratory gifts).

Part Materials

As discussed above, the chocolate material for printing chocolate confections includes chocolate, such as sweet chocolate (e.g., milk chocolate), dark chocolate, white chocolate, baking chocolate, and the like. The chocolate material desirably includes at least about 90% by weight, and more desirably at least about 95% by weight of chocolate, based on an entire weight of the chocolate material. In embodiments in which the chocolate material includes one or more additional additives, suitable additional additives include colorants, flavorants (e.g., mint, vanilla, coffee, cherry, strawberry, and/or orange flavorants), rheology modifiers, emulsifiers, surfactants, and the like. In one embodiment, the chocolate material consists essentially of chocolate (e.g., consists essentially of milk chocolate, dark chocolate, white chocolate, baking chocolate, and combinations thereof).

The chocolate in the chocolate material also desirably has small particles sizes. Examples of suitable average diameters for the chocolate range from about 5 micrometers to about 50 micrometers, with particularly suitable average diameters ranging from about 10 micrometers to about 20 micrometers.

While the additive manufacturing systems of the present disclosure have been described in use with a chocolate material, in alternative embodiments, such systems are also applicable for use in building 3D objects from a variety of different multi-phase materials that tend to segregate without mixing. For example, the systems may be used to build 3D objects from polymeric, multi-phase part materials such as polymeric blends of polystyrene and polyester.

Support Materials

In some embodiments, the additive manufacturing systems of the present disclosure may also be configured to deposit support materials for the chocolate confections (e.g., with additional print heads). In particular, the supporting layers or structures are typically built underneath overhanging portions or in cavities of the shapes being built, which are not supported by the chocolate part material itself. A support structure may be built utilizing the same deposition techniques by which the chocolate part material is deposited. The host computer generates additional geometry acting as a support structure for the overhanging or free-space segments of the shape being formed. Support material may then be deposited from a second print head pursuant to the generated geometry during the build process. The support material adheres to the chocolate part material during fabrication, and is removable from the completed confection when the build process is complete.

One example of a suitable support material for use with the chocolate part materials includes palm kernel oil, which is chemically compatible with chocolate, edible, and has a melting temperature lower than chocolate. The palm kernel oil desirably has a high melting temperature (i.e., a harder palm kernel oil) to reduce surface interactions with the chocolate material, which can otherwise result in a matte finish in the chocolate surface.

However, as discussed above, in some embodiments, the platen of the system may be moved in multiple degrees of freedom (e.g., five or more degrees of freedom). For example, platen 320 (shown in FIG. 11) may be moved in any direction along the x-axis, y-axis, z-axis, as well as being rotated around x-axis and the y-axis. This allows platen 320 to orient confection 316 such that the layers are always being built upward along the vertical z-axis. This may reduce or eliminate the need for support materials.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

An additive manufacturing system corresponding to system 114 (shown in FIGS. 3-10) was fabricated and used to print multiple chocolate confections from a chocolate material. The chocolate material used in the printing operations was a milk chocolate commercially available under the trade designation "HERSHEY'S BLISS" from The Hershey Company, Hershey, Pa., which was a pre-tempered, phase V crystal chocolate.

During operation, heated air was blown into heating boxes 152 and 154. The heated air blown into heating box 152 exited from a vent in heating box 152, and was heated to a temperature that maintained a temperature of about 86° F. in shear tank 122. In comparison, the heated air blown into heating box 154 flowed through outer tube 180, print head 126, outer tube 182, and exited the system through vent opening 236 in re-melter 128. The heated air blown into heating box 154 was slightly higher than that blown into heating box 152 to keep the chocolate material flowing through conduit 136, pump 124, conduit 138, print head 126, conduit 148, and conduit 150 at a temperature of 88 F. Re-melter 128 was also directed to maintain a heating set point of 88° F.

The chocolate material was then charged to shear tank 122, and was heated and sheared (i.e., to 86° F.), resulting in a flowable chocolate material. The flowable chocolate material then flowed down conduit 136 pump 124. Pump 124 was then started to pump the flowable chocolate material through the recirculation loop. After a steady state flow was achieved in the recirculation loop, the computer-operated controller then directed x-y gantry 158 to move print head 126 around in the horizontal x-y plane, while also directing viscosity pump 144 to extrude portions of the flowable chocolate material onto platen 120.

The extrusion path was based on instructions received by the controller, and followed tool paths used to build a layer of confection 116. After the given layer of confection 116 was completed, the controller then directed viscosity pump 144 to stop extruding the chocolate material, and directed the platen gantry to lower along the vertical z-axis by a single-layer increment. The controller then directed x-y gantry 158 to move print head 126 around in the horizontal x-y plane, while also directing viscosity pump 144 to print the next layer of confection 116.

After a 50-minute period, the controller directed system 114 to undergo a batch re-tempering process. This involved stopping viscosity pump 144 and pump 124, and directing re-melter 128 to increase its temperature set point to 108° F. The controller then directed pump 124 to restart pumping the flowable chocolate material through the recirculation loop. The flowable chocolate material entering re-melter 128 was rapidly melted to a fully melted, liquefied state, and directed back to shear tank 122. Additional crystal seeds of the chocolate material were also introduced to shear tank 122. The liquefied chocolate material reentering shear tank 122 was cooled down under shear and blended with the crystal seeds to re-temper the chocolate material to phase V crystal chocolate.

After about 15% by weight to about 20% by weight of the chocolate material was liquefied, the controller then lowered the set point temperature of re-melter 128 back down to 88° F. The chocolate material flowing through the recirculation loop cooled re-melter 128 back down to the set point temperature. When this point was reached, the controller then directed print head 126 and x-y gantry 158 to continue printing the next layer of confection 116. The printing operation then continued to build successive portions of confection 116. After each 50-minute period, system 114 went through the batch re-tempering process to thin out the flow of the chocolate material. Upon cooling, the resulting confection 116 printed with system 114 exhibited good part quality and retained the temper of the phase V chocolate material.

Although the present disclosure has been described with reference to several embodiments, workers skilled in the art will recognize that changes may be made in form and detail without departing from the spirit and scope of the disclosure.

The invention claimed is:

1. An additive manufacturing system for printing a three-dimensional chocolate confection, the additive manufacturing system comprising:
  at least one controller configured to receive instructions for printing the three-dimensional chocolate confection, and further configured to relay commands relating to the received instructions;
  a platen configured to move in a z direction;
  a recirculation loop configured to circulate a flow of a chocolate material, and further configured to maintain a temper and a shear of the flow of the chocolate material wherein the recirculation loop comprises:
    a shear tank configured to heat and shear the chocolate material; and
    a pump configured to pump the flow of the chocolate material from the shear tank to the print head;
  a print head in signal communication with the at least one controller, the print head being configured to receive at least a first portion of the chocolate material from the recirculation loop, and further configured to extrude and deposit the first portion of the chocolate material onto the platen to print at least a portion of the three-dimensional chocolate confection in an x-y build plane such that the portion of the three-dimensional chocolate confection is printed in a layer by layer manner with at least a portion of a subsequent layer printed on top of at least a portion of a previous layer based on the commands from the at least one controller; and a re-melter configured to receive a second portion of the flowable chocolate material from the print head and to direct the second portion of flowable chocolate material to a reservoir, wherein the re-melter is further configured to heat the second portion of the flowable chocolate material to fully melt the second portion of the flowable chocolate material, and is configured to allow the second portion of the flowable chocolate material to be re-tempered during a print operation to maintain the second portion of the flowable chocolate material in a liquefying temperature.

2. The additive manufacturing system of claim 1, wherein the shear tank is maintained at a set point temperature ranging from about 82° F. to about 90° F.

3. The additive manufacturing system of claim 1, wherein the shear tank is configured to receive a cartridge of tempered solid chocolate material.

4. The additive manufacturing system of claim 1, wherein the recirculation loop is configured to re-temper the second portion of the flowable chocolate material in a batch operation.

5. The additive manufacturing system of claim 1, and further comprising a gantry mechanism configured to move the print head along at least one axis relative to the platen.

6. The additive manufacturing system of claim 1, and further comprising a platen gantry configured to move the platen with at least five degrees of freedom.

7. An additive manufacturing system for printing a three-dimensional chocolate confection, the additive manufacturing system comprising:
   a recirculation loop configured to circulate a flow of a chocolate material, and further configured to maintain a temper and a shear of the flow of the chocolate material;
   a reservoir configured to shear and heat the chocolate material to a temperature ranging from about 82° F. to about 90° F. to provide a flowable chocolate material;
   a pump configured to pump the flowable chocolate material from the reservoir;
   a platen configured for movement in an x-y build plane;
   a print head configured to receive the pumped flowable chocolate material, and further configured for movement in a z direction and relative to the platen to extrude a first portion of the received chocolate material in a layer by layer manner for printing at least a portion of the three-dimensional chocolate confection;
   a heating line configured to heat the pumped flowable chocolate material as the pumped flowable chocolate material flows through the pump to the print head; and
   a re-melter configured to receive a second portion of flowable chocolate material from the print head and to direct the second portion of flowable chocolate material to the reservoir, wherein the re-melter is further configured to heat the second portion of the flowable chocolate material to fully melt the second portion of the flowable chocolate material, and is configured to allow the second portion of the flow of the chocolate material to be re-tempered during a print operation to maintain the second portion of the flowable chocolate material in a liquefying temperature.

8. The additive manufacturing system of claim 7, wherein the temperature that the reservoir is configured to heat the chocolate material to a temperature ranging from about 85° F. to about 87° F.

9. The additive manufacturing system of claim 7, wherein the heating line is configured to heat the pumped flowable chocolate material to a temperature ranging from about 87° F. to about 89° F.

10. The additive manufacturing system of claim 7, wherein the re-melter is configured to heat the second portion of the flowable chocolate material to a temperature ranging from about 100° F. to about 110° F.

11. The additive manufacturing system of claim 7, further comprising a conduit interconnecting the pump and the print head, the conduit being configured to relay the pumped flowable chocolate material from the pump to the print head, and wherein the heating line comprises an outer tube encasing at least a portion of a length of the conduit, the outer tube being configured to relay a heated fluid to the print head.

12. The additive manufacturing system of claim 7, further comprising a temper meter configured to monitor a viscosity of the pumped flowable chocolate material.

13. An additive manufacturing system for printing a three-dimensional chocolate confection in a layer by layer manner, the additive manufacturing system comprising:
   at least one controller configured to receive instructions for printing the three-dimensional chocolate confection, and further configured to relay commands relating to the received instructions;
   a recirculation loop configured to circulate a flow of a chocolate material, and further configured to maintain a temper and a shear of the flow of the chocolate material;
   a platen movable along a z-axis;
   a reservoir configured to shear and heat a chocolate material to provide a flowable chocolate material;
   a pump configured to pump the flowable chocolate material from the reservoir;
   a print head movable relative to the platen and in an x-y build plane in signal communication with the at least one controller, the print head being configured to receive the pumped flowable chocolate material, and further configured to extrude and deposit a first portion of the chocolate material onto the platen to print at least a portion of the three-dimensional chocolate confection based on the commands from the at least one controller, the commands comprising moving the print head in the x-y build plane relative to the platen which is moved incrementally along the z-axis for printing the chocolate confection in a layer by layer manner; and
   a re-melter configured to receive a second portion of flowable chocolate material from the print head and to direct the second portion of flowable chocolate material to the reservoir, wherein the re-melter is further configured to heat the second portion of the flowable chocolate material to fully melt the second portion of the flowable chocolate material, and is configured to allow the second portion of the flow of the chocolate material to be re-tempered during a print operation to maintain the second portion of the flowable chocolate material in a liquefying temperature.

14. The additive manufacturing system of claim 13, wherein the reservoir is maintained at a set point temperature ranging from about 28° C. to about 32° C.

15. The additive manufacturing system of claim 13, wherein the reservoir is configured to receive a cartridge of tempered solid chocolate material.

16. The additive manufacturing system of claim 13, wherein the print head comprises an auger-based pump.

17. The additive manufacturing system of claim 13, and further comprising a conduit interconnecting the pump and the print head, the conduit being configured to relay the pumped flowable chocolate material from the pump to the print head, and an outer tube encasing at least a portion of a length of the conduit, the outer tube being configured to relay a heated fluid to the print head.

18. The additive manufacturing system of claim 13, and further comprising a temper meter configured to monitor a viscosity of the pumped flowable chocolate material.

* * * * *